US012769433B2

(12) United States Patent
Zhang et al.

(10) Patent No.: US 12,769,433 B2
(45) Date of Patent: Oct. 20, 2026

(54) ICON SPLICING METHOD AND RELATED DEVICE

(71) Applicant: HUAWEI TECHNOLOGIES CO., LTD., Shenzhen (CN)

(72) Inventors: Li Zhang, Nanjing (CN); Wanyi Yang, Nanjing (CN); Feng Chen, Nanjing (CN); Yuan Cao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 225 days.

(21) Appl. No.: 18/701,621

(22) PCT Filed: Dec. 9, 2022

(86) PCT No.: PCT/CN2022/137998

§ 371 (c)(1),
(2) Date: Apr. 16, 2024

(87) PCT Pub. No.: WO2023/124908

PCT Pub. Date: Jul. 6, 2023

(65) Prior Publication Data

US 2025/0028424 A1 Jan. 23, 2025

(30) Foreign Application Priority Data

Dec. 29, 2021 (CN) ........................ 202111649832.2

(51) Int. Cl.

| | |
|---|---|
| ***G06F 3/04817*** | (2022.01) |
| ***G06F 3/0482*** | (2013.01) |
| ***G06F 3/04847*** | (2022.01) |

(52) U.S. Cl.
CPC ........ *G06F 3/04817* (2013.01); *G06F 3/0482* (2013.01); *G06F 3/04847* (2013.01)

(58) Field of Classification Search
CPC ............... G06F 3/04817; G06F 3/0482; G06F 3/04847; G06F 3/04845; G06F 3/0486; G06F 3/0488
See application file for complete search history.

(56) References Cited

U.S. PATENT DOCUMENTS

| | | | | |
|---|---|---|---|---|
| 10,180,767 | B2 * | 1/2019 | Lee | G06F 3/0486 |
| 10,534,637 | B1 * | 1/2020 | Kontsov | G06F 9/541 |
| 10,616,433 | B2 * | 4/2020 | Miyazaki | H04N 1/00941 |
| 11,080,089 | B1 * | 8/2021 | Kontsov | G06F 9/541 |

(Continued)

FOREIGN PATENT DOCUMENTS

CN 102520856 A 6/2012

*Primary Examiner* — Kenny Nguyen

(57) ABSTRACT

This disclosure provides an icon splicing method and related device. In this method, a terminal device may display a first icon, and display a second icon in response to an operation of triggering to splice the first icon; display, in response to an operation of selecting the second icon and the first icon for splicing, options of a plurality of functions corresponding to the second icon; and display, in response to an operation of selecting an option of a second function, a spliced icon of the first icon and the second icon. The second function includes one or more of the plurality of functions corresponding to the second icon. The spliced icon has a function of supporting linkage between a first function and the second function. The first function includes one or more of a plurality of functions corresponding to the first icon.

19 Claims, 28 Drawing Sheets

(56) References Cited

U.S. PATENT DOCUMENTS

| | | | | |
|---|---|---|---|---|
| 11,379,159 | B2 * | 7/2022 | Ketsuka | G06F 3/04817 |
| 11,941,431 | B1 * | 3/2024 | Kontsov | G06F 9/4843 |
| 2013/0219341 | A1 * | 8/2013 | Lee | G06F 3/0482<br>715/835 |
| 2014/0164957 | A1 * | 6/2014 | Shin | H04L 65/403<br>715/806 |
| 2014/0229898 | A1 * | 8/2014 | Terwedo | G06F 3/04817<br>715/835 |
| 2014/0245203 | A1 * | 8/2014 | Lee | G06F 3/04845<br>715/765 |
| 2014/0355021 | A1 * | 12/2014 | Kirihara | G03G 15/50<br>358/1.13 |
| 2016/0216864 | A1 * | 7/2016 | Miyazaki | H04N 1/00941 |
| 2017/0255357 | A1 * | 9/2017 | Judd | G06F 3/0486 |
| 2017/0322708 | A1 * | 11/2017 | Huang | G06F 3/04842 |
| 2018/0364952 | A1 * | 12/2018 | Ketsuka | G03G 15/502 |
| 2019/0065031 | A1 * | 2/2019 | Kang | G06F 3/04817 |

* cited by examiner

ICON SPLICING METHOD AND RELATED DEVICE

CROSS-REFERENCE TO RELATED APPLICATIONS

This application is a national stage of International Application No. PCT/CN2022/137998, filed on Dec. 9, 2022, which claims priority to Chinese Patent Application No. 202111649832.2, filed on Dec. 29, 2021. Both of the aforementioned applications are hereby incorporated by reference in their entireties.

TECHNICAL FIELD

This application relates to the field of electronic devices, and in particular, to an icon splicing method and a related device.

BACKGROUND

Currently, some mobile phones have functions of splicing and displaying application icons. For example, a display interface of the mobile phone (for example, a home screen of the mobile phone) may include an application icon 1 and an application icon 2. Based on the functions of splicing and displaying the application icons, a user may splice the application icon 1 with the application icon 2, to obtain a new spliced icon, and the mobile phone may display the new spliced icon on the display interface. An area occupied by the new spliced icon on the display interface of the mobile phone may be less than a sum of areas occupied by the icon 1 and the icon 2 on the display interface of the mobile phone. This can effectively reduce space of the display interface of the mobile phone.

However, the current spliced icon cannot respond intelligently to a user interaction action, and user interaction efficiency needs to be improved.

SUMMARY

This application provides an icon splicing method and a related device, so that a spliced icon responds more intelligently to a user interaction action, and user interaction efficiency can be effectively improved.

According to a first aspect, this application provides an icon splicing method applied to a terminal device. The method includes: displaying a first icon; receiving a first operation, where the first operation is an operation of triggering splicing of the first icon; displaying a second icon in response to the first operation; receiving a second operation, where the second operation is an operation of selecting the second icon and the first icon for splicing; displaying, in response to the second operation, options of a plurality of functions corresponding to the second icon; receiving an operation of selecting an option of a second function, where the second function includes one or more of the plurality of functions corresponding to the second icon; and displaying, in response to the operation of selecting the option of the second function, a spliced icon of the first icon and the second icon. The spliced icon has a function of supporting linkage between a first function and the second function. The first function includes one or more of a plurality of functions corresponding to the first icon.

For example, the first icon and/or the second icon may be an application icon or a feature ability (feature ability, FA) card icon, and an FA card may be briefly referred to as a card or a function card. An application corresponding to the application icon may include one or more functions, and an FA card corresponding to the FA card icon may also include one or more functions.

In the method, the spliced icon of the first icon and the second icon supports the linkage between the first function and the second function, so that the spliced icon responds more intelligently to a user interaction action, and user interaction efficiency can be effectively improved.

In a possible implementation, the method further includes: displaying, in response to the second operation, options of the plurality of functions corresponding to the first icon; and receiving an operation of selecting an option of the first function.

The displaying, in response to the operation of selecting the option of the second function, a spliced icon of the first icon and the second icon includes: displaying, in response to the operation of selecting the option of the first function and the operation of selecting the option of the second function, the spliced icon of the first icon and the second icon.

For example, the terminal device includes an icon 1 and an icon 2, the icon 1 is an application icon, and the icon 2 is an FA card icon. In the icon splicing method, a user may select the icon 1 and the icon 2, select one or more functions from a function included in an application corresponding to the icon 1, and select one or more functions from an FA card corresponding to the icon 2 for splicing, to generate a spliced icon. It is assumed that the function selected by the user from the function included in the application corresponding to the icon 1 is a function 1, and the function selected by the user from the function included in the FA card corresponding to the icon 2 is a function 2. In this case, the generated spliced icon may support linkage between the function 1 and the function 2, and the spliced icon may respond more intelligently to a user interaction action.

In another possible implementation, the first function is a default splicing function corresponding to the first icon.

For example, the terminal device includes an icon 1 and an icon 2, the icon 1 is an application icon, and the icon 2 is an FA card icon. In the icon splicing method, a user may select the icon 1 and the icon 2, and select one or more functions from an FA card corresponding to the icon 2 to splice with a default function of the icon 1, to generate a spliced icon. It is assumed that the function selected by the user from the function included in the FA card corresponding to the icon 2 is a function 2, and the default function of the icon 1 is a function 1. In this case, the generated spliced icon may support linkage between the function 1 and the function 2, and the spliced icon may respond more intelligently to a user interaction action.

Optionally, the method further includes: receiving an operation of tapping the spliced icon; and enabling the first function and the second function in response to the operation of tapping the spliced icon.

For example, a mobile phone may display a spliced icon of a running icon and a music icon on a home screen of the mobile phone. The spliced icon may include a pattern of the running icon and a pattern of the music icon. After the user taps the spliced icon, the mobile phone may enable a “starting to run” function in response to the operation of tapping the spliced icon by the user, and enable a “playing music” function in linkage. For example, the mobile phone may start to record running information and play music at the same time.

It can be learned that the icon splicing method splices icons in terms of presentation effect, and implements splicing and linkage between functions corresponding to the icons.

In a possible implementation, the displaying the spliced icon of the first icon and the second icon includes: obtaining a current screen form of the terminal device; determining a layout of the first icon and the second icon in the spliced icon based on the current screen form; and displaying the spliced icon of the first icon and the second icon based on the layout of the first icon and the second icon in the spliced icon.

Optionally, the determining a layout of the first icon and the second icon in the spliced icon based on the current screen form includes: when the current screen form is in a landscape state, determining that the layout of the first icon and the second icon in the spliced icon is a left-right layout; or when the current screen form is in a portrait state, determining that the layout of the first icon and the second icon in the spliced icon is a top-down layout.

For example, the terminal device may include a display. When generating the spliced icon, the terminal device may first obtain that a current screen form of the display is in a landscape state or a portrait state. When the screen form is in the landscape state, an aspect ratio of a screen is usually greater than 1, and the terminal device may determine that a relative location relationship between the first icon and the second icon in the layout is the left-right layout. When the screen form is in the portrait mode, an aspect ratio of a screen is generally less than 1, and the terminal device may determine that a relative location relationship between the first icon and the second icon in the layout is the top-down layout.

Optionally, the terminal device may receive an operation of dragging the first icon or the second icon by the user, and adjust the relative location relationship between the first icon and the second icon in the layout.

In a possible implementation, an area occupied by the first icon in the spliced icon is greater than an area occupied by the second icon in the spliced icon.

The area occupied by the first icon is greater than the area occupied by the second icon, so that a specific icon may be more intuitively fed back to the user as a main card icon.

For example, the area occupied by the first icon may occupy two-thirds of an area of the entire spliced icon, and the area occupied by the second icon may occupy one-third of the area of the entire spliced icon.

Optionally, the displaying a first icon includes: displaying a first interface, where the first interface includes the first icon.

The receiving a first operation includes: receiving an operation of selecting the first icon; displaying, in response to the operation of selecting the first icon, a splicing key corresponding to the first icon; and receiving an operation of tapping the splicing key corresponding to the first icon.

For example, the first interface may be a system main screen of the terminal device, for example, the home screen of the mobile phone.

In a possible implementation, the displaying a second icon in response to the first operation includes: displaying the first interface again in response to the first operation, where the first interface further includes the second icon.

Optionally, the method further includes: when the first interface is displayed again, highlighting the first icon in the first interface, or displaying a first identifier related to the first icon.

When the first interface is displayed again, the to-be-spliced first icon selected by the user is highlighted or the first identifier is displayed, to prompt the user that the first icon is the selected to-be-spliced icon.

In another possible implementation, the displaying a second icon in response to the first operation includes: displaying a second interface in response to the first operation, where the second interface includes all icons of the terminal device, or an icon that supports splicing in all the icons of the terminal device.

Optionally, the second interface may be referred to as a card center screen or an application center screen. The second interface may be provided by a system capability of the terminal device. The system capability may be referred to as a card center or an application center. The card center or the application center may include all application icons of applications and card icons of cards installed in a system, or include an icon that supports splicing in all application icons of applications and card icons of cards installed in a system. The icon that supports splicing in the all icons of the terminal device may include all icons that can support splicing, or an icon that can be spliced with the first icon.

In a possible implementation, the method further includes: receiving an operation of previewing the spliced icon of the first icon and the second icon; and displaying a preview screen in response to the operation of previewing the spliced icon of the first icon and the second icon, where the preview screen includes the spliced icon of the first icon and the second icon.

For example, the terminal device may display one splicing preview key, and the operation of previewing the spliced icon of the first icon and the second icon may be an operation of tapping the splicing preview key.

Optionally, on the preview screen, a change occurs in display effect of the splicing preview key. The change may be a change in one or more dimensions such as a shape, a color, and an animation, and is used to prompt the user that the spliced icon is currently previewed.

Optionally, the preview screen of the spliced icon may further include a text prompt used to prompt the user that the spliced icon is currently previewed. For example, the text prompt may be “A spliced FA card will be displayed on the home screen in this way”.

In a possible implementation, the first icon is a spliced icon of a third icon and a fourth icon.

In other words, the first icon may be a spliced icon obtained by splicing the third icon and the fourth icon. In this application, after two icons are spliced to obtain a spliced icon, the spliced icon may be further spliced with a new icon.

For example, in a possible example, the first icon may alternatively be a spliced icon obtained by splicing a running icon and a music icon. The user may splice the spliced icon with an alarm icon in a similar manner, and select a function of the alarm as providing a reminder at target time. After the user taps a spliced icon obtained by splicing the spliced icon with the alarm icon, the mobile phone may start to record running information, start to play music, and may remind the user to end running after the target time set by the alarm is reached.

In a possible implementation, the method further includes: receiving an operation of splitting the spliced icon; and deleting the spliced icon in response to the operation of splitting the spliced icon.

For example, the user may press and hold the spliced icon, and the terminal device may receive the operation of pressing and holding the spliced icon by the user. The terminal device may display one split key in response to the operation of touching and holding the spliced icon by the user. The user may tap the split key, and the terminal device may split the spliced icon in response to the operation of tapping the split key by the user, for example, may delete or no longer display the spliced icon.

According to a second aspect, this application provides an icon splicing apparatus. The apparatus may be applied to a terminal device, so that the terminal device performs the icon splicing method according to any one of the first aspect and the possible implementations of the first aspect. A function of the apparatus may be implemented by hardware, or may be implemented by hardware by executing corresponding software. The hardware or software includes one or more modules or units corresponding to the steps in the icon splicing method according to any one of the first aspect and the possible implementations of the first aspect.

For example, the apparatus includes a display unit, a receiving unit, a processing unit, and the like. The display unit is configured to display a first icon. The receiving unit is configured to receive a first operation, where the first operation is an operation of triggering splicing of the first icon. The processing unit is configured to display, in response to the first operation, a second icon by using the display unit. The receiving unit is further configured to receive a second operation, where the second operation is an operation of selecting the second icon and the first icon for splicing. The processing unit is further configured to display, in response to the second operation, options of a plurality of functions corresponding to the second icon by using the display unit. The receiving unit is further configured to receive an operation of selecting an option of a second function. The second function includes one or more of the plurality of functions corresponding to the second icon. The processing unit is further configured to display, in response to the operation of selecting the option of the second function, a spliced icon of the first icon and the second icon by using the display unit. The spliced icon has a function of supporting linkage between a first function and the second function. The first function includes one or more of a plurality of functions corresponding to the first icon.

In a possible implementation, the processing unit is further configured to display, in response to the second operation, options of the plurality of functions corresponding to the first icon by using the display unit. The receiving unit is further configured to receive an operation of selecting an option of the first function.

The processing unit is configured to display, in response to the operation of selecting the option of the first function and the operation of selecting the option of the second function, the spliced icon of the first icon and the second icon by using the display unit.

In another possible implementation, the first function is a default splicing function corresponding to the first icon.

Optionally, the receiving unit is further configured to receive an operation of tapping the spliced icon; and the processing unit is further configured to enable the first function and the second function in response to the operation of tapping the spliced icon.

In a possible implementation, the processing unit is configured to: obtain a current screen form of the terminal device; determine a layout of the first icon and the second icon in the spliced icon based on the current screen form; and display the spliced icon of the first icon and the second icon by using the display unit based on the layout of the first icon and the second icon in the spliced icon.

Optionally, the processing unit is configured to: when the current screen form is a landscape state, determine that the layout of the first icon and the second icon in the spliced icon is a left-right layout; or when the current screen form is a portrait state, determine that the layout of the first icon and the second icon in the spliced icon is a top-down layout.

In a possible implementation, an area occupied by the first icon in the spliced icon is greater than an area occupied by the second icon in the spliced icon.

Optionally, the display unit is configured to display a first interface, where the first interface includes the first icon.

The receiving unit is configured to receive an operation of selecting the first icon. The processing unit is further configured to display, in response to the operation of selecting the first icon, a splicing key corresponding to the first icon by using the display unit. The receiving unit is further configured to receive an operation of tapping the splicing key corresponding to the first icon. The operation of selecting the first icon and the operation of tapping the splicing key corresponding to the first icon are the first operation.

In a possible implementation, the processing unit is configured to display the first interface again in response to the first operation by using the display unit, where the first interface further includes the second icon.

Optionally, the display unit is further configured to: when the first interface is displayed again, highlighting the first icon in the first interface, or displaying a first identifier related to the first icon.

In another possible implementation, the processing unit is configured to display a second interface in response to the first operation by using the display unit, where the second interface includes all icons of the terminal device, or an icon that supports splicing in all the icons of the terminal device.

In a possible implementation, the receiving unit is further configured to receive an operation of previewing the spliced icon of the first icon and the second icon; and the processing unit is further configured to display, by using the display unit, a preview screen in response to the operation of previewing the spliced icon of the first icon and the second icon. The preview screen includes the spliced icon of the first icon and the second icon.

In a possible implementation, the first icon is a spliced icon of a third icon and a fourth icon.

In a possible implementation, the receiving unit is further configured to receive an operation of splitting the spliced icon; and the processing unit is further configured to delete the spliced icon in response to the operation of splitting the spliced icon.

According to a third aspect, this application provides an electronic device. For example, the electronic device may be the terminal device according to the first aspect. The electronic device includes: a processor, and a memory, configured to store instructions executable by the processor. When the processor is configured to execute the instructions, the electronic device is enabled to perform the icon splicing method according to any one of the first aspect and the possible implementations of the first aspect.

According to a fourth aspect, this application provides a computer-readable storage medium. The computer-readable storage medium stores computer program instructions. When the computer program instructions are executed by an electronic device, the electronic device is enabled to perform the icon splicing method according to any one of the first aspect and the possible implementations of the first aspect.

According to a fifth aspect, this application provides a computer program product, including computer-readable code or a non-volatile computer-readable storage medium carrying computer-readable code. When the computer-readable code is run in an electronic device, a processor in the electronic device performs the icon splicing method according to any one of the first aspect and the possible implementations of the first aspect.

For beneficial effects of the second aspect to the fifth aspect, refer to the description in the first aspect. Details are not described herein again.

According to a sixth aspect, this application provides an icon splicing method applied to a terminal device. The method includes: displaying a first icon; receiving a first operation, where the first operation is an operation of triggering splicing of the first icon; displaying, in response to the first operation, identifier information of one or more system capabilities supported by the terminal device; receiving a second operation, where the second operation is an operation of selecting identifier information of a first system capability, and the first system capability includes at least one system capability supported by the terminal device; and displaying, in response to the second operation, a spliced icon of the first icon and the first system capability, where the spliced icon has a function of supporting linkage between an application or a feature ability FA card corresponding to the first icon and the first system capability.

In the method, the terminal device may include at least one icon, and the icon may be an application icon or an FA card icon. The terminal device may support one or more system capabilities. A user may select one first icon from an icon included in the terminal device, select at least one system capability from the system capabilities supported by the terminal device to splice with the first icon, to generate a spliced icon. The generated spliced icon may support linkage between the application or the FA card corresponding to the first icon and the system capability. The spliced icon responds more intelligently to a user interaction action, and user interaction efficiency can be effectively improved.

The system capability may include "time", "location", Wi-Fi, and the like.

Optionally, the method further includes: start, in response to detecting a trigger of the first system capability, the application or the FA card corresponding to the first icon.

For example, a mobile phone may display a spliced icon of a shopping icon and the "time" on a home screen of the mobile phone. The spliced icon may include a pattern of the shopping icon and time set by the user in a setting menu. For example, if the time set by the user in the setting menu is "Nov. 28, 2021 17:00", time included in the spliced icon may be "28-11-2021 17:00". When system time of the mobile phone reaches 17:00 on Nov. 28, 2021, the mobile phone may detect a trigger of the first system capability, and start a shopping application or an FA card corresponding to the shopping icon.

The "28-11-2021 17:00" may be further considered as identifier information of the first system capability. In this embodiment, for a layout relationship between the first icon and identifier information of the system capability in the spliced icon, refer to the layout relationship between the first icon and the second icon in the first aspect. Alternatively, the identifier information of the system capability may be displayed above the first icon. This is not limited.

Optionally, the displaying a first icon includes: displaying a first interface, where the first interface includes the first icon.

The receiving a first operation includes: receiving an operation of selecting the first icon; displaying, in response to the operation of selecting the first icon, an automatic trigger key corresponding to the first icon; and receiving an operation of tapping the automatic trigger key corresponding to the first icon.

For example, the first interface may be a system main screen of the terminal device, for example, the home screen of the mobile phone.

In a possible implementation, the first icon is a spliced icon of a third icon and a fourth icon, or the first icon is a spliced icon of a third icon and a second system capability.

That is, the first icon may be the spliced icon obtained by splicing the third icon and the fourth icon, or the spliced icon obtained by splicing the third icon and the second system capability. In this application, after two icons are spliced to obtain a spliced icon, or after one icon is spliced with the second system capability to obtain a spliced icon, the spliced icon may further be spliced with the first system capability.

For another example, the terminal device may be a mobile phone, the mobile phone may be a mobile phone with a foldable display, and the first icon may alternatively be a spliced icon obtained by splicing a passenger code icon and a health code icon. The user may splice the spliced icon obtained by splicing the passenger code icon and the health code icon with a system capability "display folding" in a similar manner. When the mobile phone detects that the foldable display is opened, passenger code and health code can be opened at the same time. In a scenario in which the user uses a vehicle like a subway or a bus, it may be more convenient for the user to display the health code and scan bus code to use the vehicle.

In a possible implementation, the method further includes: receiving an operation of splitting the spliced icon; and deleting the spliced icon in response to the operation of splitting the spliced icon.

According to a seventh aspect, this application provides an icon splicing apparatus. The apparatus may be applied to a terminal device, so that the terminal device performs the icon splicing method according to any one of the sixth aspect and the possible implementations of the sixth aspect. A function of the apparatus may be implemented by hardware, or may be implemented by hardware by executing corresponding software. The hardware or software includes one or more modules or units corresponding to the steps in the icon splicing method according to any one of the sixth aspect and the possible implementations of the sixth aspect.

For example, the apparatus includes a display unit, a receiving unit, a processing unit, and the like. The display unit is configured to display a first icon. The receiving unit is configured to receive a first operation, where the first operation is an operation of triggering splicing of the first icon. The processing unit is configured to display, in response to the first operation by using the display unit, identifier information of one or more system capabilities supported by the terminal device. The receiving unit is further configured to receive a second operation, where the second operation is an operation of selecting identifier information of a first system capability. A first system capability includes at least one system capability supported by the terminal device. The processing unit is further configured to display, in response to the second operation, a spliced icon of the first icon and the first system capability by using the display unit. The spliced icon has a function of supporting linkage between an application or a feature ability FA card corresponding to the first icon and the first system capability.

Optionally, the processing unit is further configured to start, in response to detecting a trigger of the first system capability, the application or the FA card corresponding to the first icon.

Optionally, the display unit is configured to display a first interface, where the first interface includes the first icon.

The receiving unit is configured to receive an operation of selecting the first icon. The processing unit is further configured to display, in response to the operation of selecting the first icon, an automatic trigger key corresponding to the first icon by using the display unit. The receiving unit is further configured to receive an operation of tapping the automatic trigger key corresponding to the first icon. The operation of selecting the first icon and the operation of tapping the automatic trigger key corresponding to the first icon are the first operation.

In a possible implementation, the first icon is a spliced icon of a third icon and a fourth icon.

In a possible implementation, the receiving unit is further configured to receive an operation of splitting the spliced icon; and the processing unit is further configured to delete the spliced icon in response to the operation of splitting the spliced icon.

According to an eighth aspect, this application provides an electronic device. For example, the electronic device may be the terminal device according to the sixth aspect. The electronic device includes: a processor, and a memory, configured to store instructions executable by the processor. When the processor is configured to execute the instructions, the electronic device is enabled to perform the icon splicing method according to any one of the sixth aspect and the possible implementations of the sixth aspect.

According to a ninth aspect, this application provides a computer-readable storage medium. The computer-readable storage medium stores computer program instructions. When the computer program instructions are executed by an electronic device, the electronic device is enabled to perform the icon splicing method according to any one of the sixth aspect and the possible implementations of the sixth aspect.

According to a tenth aspect, this application provides a computer program product, including computer-readable code or a non-volatile computer-readable storage medium carrying computer-readable code. When the computer-readable code is run in an electronic device, a processor in the electronic device performs the icon splicing method according to any one of the sixth aspect and the possible implementations of the sixth aspect.

For beneficial effects of the seventh aspect to the tenth aspect, refer to the description in the sixth aspect. Details are not described herein again.

It should be understood that descriptions of technical features, technical solutions, beneficial effects, or similar words in this application do not imply that all features and advantages can be implemented in any individual embodiment. On the contrary, it may be understood that the descriptions of the features or the beneficial effects mean that at least one embodiment includes a specific technical feature, technical solution, or beneficial effects. Therefore, the descriptions of the technical features, the technical solutions, or the beneficial effects in this specification may not necessarily be specific to a same embodiment. Further, the technical features, the technical solutions, and the beneficial effects described in embodiments may be combined in any proper manner. A person skilled in the art may understand that an embodiment may be implemented without one or more specific technical features, technical solutions, or beneficial effects in a specific embodiment. In other embodiments, additional technical features and beneficial effects may be further identified in a specific embodiment that does not reflect all embodiments.

DESCRIPTION OF EMBODIMENTS

Figure 1:
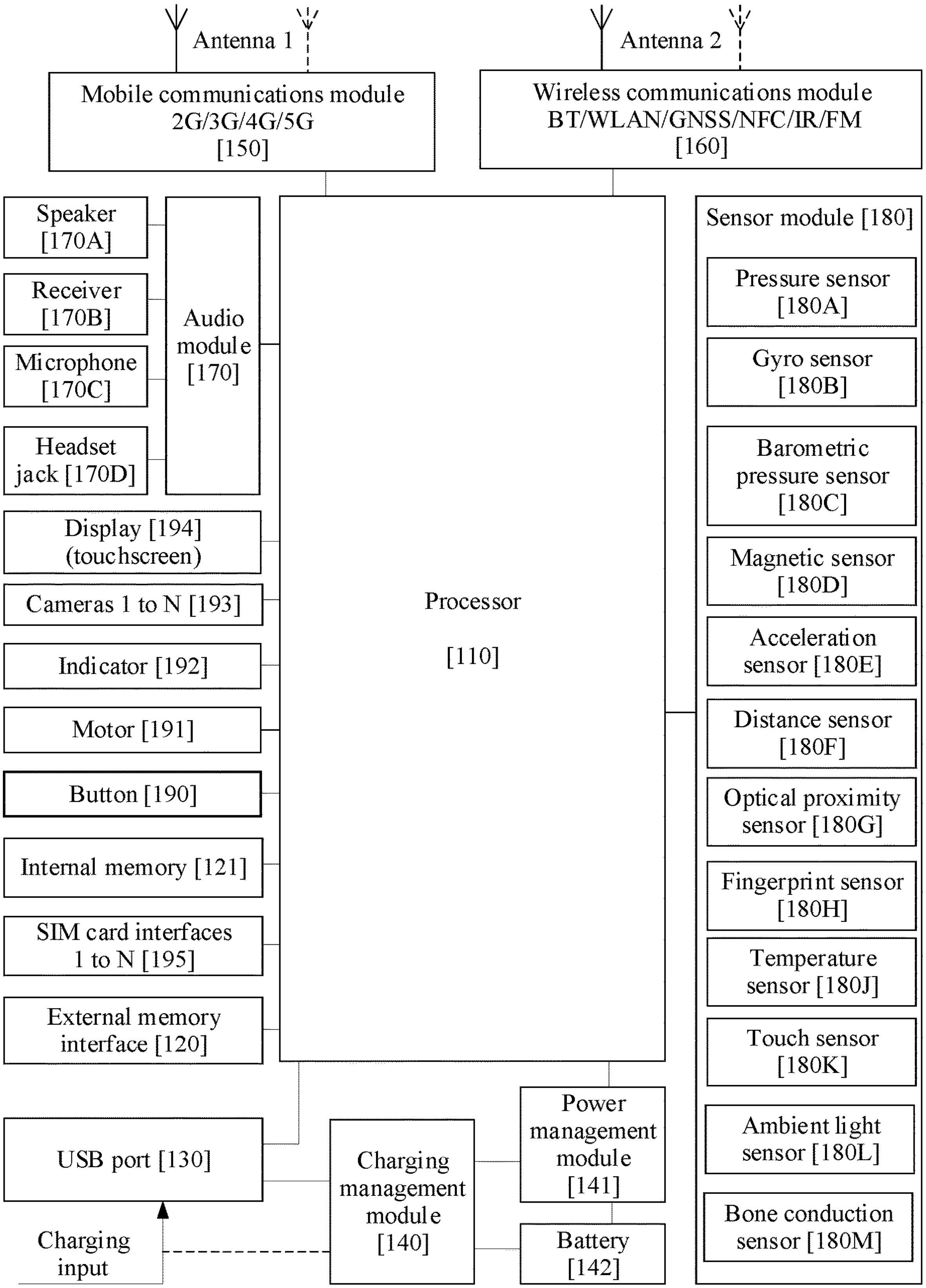
FIG. 1 is a schematic diagram of a structure of a terminal device according to an embodiment of this application.

Terms used in the following embodiments are only intended to describe specific embodiments, but are not intended to limit this application. The terms "one", "a", "the", "the foregoing", "this", and "the one" of singular forms used in this specification and the appended claims of this application are also intended to include forms such as "one or more", unless otherwise specified in the context clearly. It should be further understood that in the following embodiments of this application, "at least one" and "one or more" mean one or at least two (including two). The term "and/or" is used to describe an association relationship between associated objects and represents that three relationships may exist. For example, A and/or B may represent the following cases: Only A exists, both A and B exist, and only B exists, where A and B each may be singular or plural. The character "/" generally indicates an "or" relationship between the associated objects.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean reference to a same embodiment. Instead, the statements mean "one or more but not all of embodiments", unless otherwise emphasized in another manner. The terms "include", "comprise", "have", and their variants all mean "include but are not limited to", unless otherwise emphasized in another manner. The term "connection" includes a direct connection and an indirect connection, unless otherwise stated.

The terms such as "first" and "second" mentioned below are only intended for a purpose of description, and shall not be understood as an indication or implication of relative importance or implicit indication of a quantity of indicated technical features. Therefore, a feature defined with "first" or "second" may explicitly or implicitly include one or more features.

In embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a relative concept in a specific manner.

Currently, some mobile phones have functions of splicing and displaying application icons. For example, a display interface of the mobile phone (for example, a home screen of the mobile phone) may include an application icon 1 and an application icon 2. Based on the functions of splicing and displaying the application icons, a user may splice the application icon 1 with the application icon 2, to obtain a new spliced icon, and the mobile phone may display the new spliced icon on the display interface. An area occupied by the new spliced icon on the display interface of the mobile phone may be less than a sum of areas occupied by the icon 1 and the icon 2 on the display interface of the mobile phone. This can effectively reduce space of the display interface of the mobile phone.

However, the current spliced icon cannot respond intelligently to a user interaction action, and user interaction efficiency needs to be improved. For example, the current spliced icon supports only starting, in response to an operation of tapping a spliced icon by the user, applications respectively corresponding to two application icons (for example, the application icon 1 and the application icon 2) that form the spliced icon.

An embodiment of this application provides an icon splicing method, which may be applied to a terminal device. In the method, the terminal device may include a plurality of (for example, at least two) icons. The icon may be an application icon or a feature ability (feature ability, FA) card icon, and an FA card may be briefly referred to as a card or a function card. An application corresponding to the application icon may include one or more functions, and an FA card corresponding to the FA card icon may also include one or more functions. A user may select at least two icons from the plurality of icons included in the terminal device, and select one or more functions from a function included in an application or included in an FA card corresponding to each selected icon for splicing, to generate a spliced icon. The generated spliced icon may support linkage among the foregoing functions selected by the user. The spliced icon responds more intelligently to a user interaction action, and user interaction efficiency can be effectively improved.

For example, the terminal device includes an icon 1 and an icon 2, the icon 1 is an application icon, and the icon 2 is an FA card icon. In the icon splicing method provided in this embodiment of this application, a user may select the icon 1 and the icon 2, select one or more functions from a function included in an application corresponding to the icon 1, and select one or more functions from an FA card corresponding to the icon 2 for splicing, to generate a spliced icon. It is assumed that the function selected by the user from the function included in the application corresponding to the icon 1 is a function 1, and the function selected by the user from the function included in the FA card corresponding to the icon 2 is a function 2. In this case, the generated spliced icon may support linkage between the function 1 and the function 2, and the spliced icon may respond more intelligently to a user interaction action.

In this example, when both the icon 1 and the icon 2 are application icons, or when both the icon 1 and the icon 2 are FA card icons, or when the icon 1 is an FA card icon and the icon 2 is an application icon, a specific implementation of the icon splicing method is the same as that in the foregoing example, and details are not described again.

In this application, icons that are spliced (for example, the icon 1 and the icon 2) may include an application icon and/or an FA card icon. Specific types of the icons that are spliced are not limited in this application.

Optionally, in this embodiment of this application, the terminal device may include a mobile phone, a large screen (such as a smart screen), a tablet computer, a wearable device (such as a smartwatch or a smart band), a television, a vehicle-mounted device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), and the like. A specific form of the terminal device is not limited herein.

For example, an operating system of the terminal device may be a Harmony™ (Harmony) system, an Android™ (Android) system, an iOS™ system, a mac™ system, a Windows™ system, or the like. An operating system of the terminal device is not limited in this application either.

For example, the terminal device is a mobile phone. FIG. 1 is a schematic diagram of a structure of a terminal device according to an embodiment of this application.

As shown in FIG. 1, the terminal device may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

The processor 110 may include a plurality of processing units, for example, an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the terminal device. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data that has been recently used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) screen, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM interface, a USB port, and/or the like.

The external memory interface 120 may be used to connect to an external storage card, for example, a micro SD card, to extend a storage capability of the terminal device. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications and data processing of the terminal device. For example, the processor 110 runs the instructions stored in the internal memory 121, so that the terminal device can perform an icon splicing method in an embodiment of this application.

The internal memory 121 may further include a program storage area and a data storage area. The program storage area may store an operating system, an application required by at least one function, and the like. The data storage area may store data (for example, image data and a phone book, for another example, an application icon and an FA card icon) created in a process of using the terminal device. In addition, the internal memory 121 may include a high-speed random access memory, and may further include a non-volatile memory, for example, at least one magnetic disk storage device, a flash storage device, or a universal flash storage (universal flash storage, UFS).

The charging management module 140 is configured to receive charging input from a charger. When charging the battery 142, the charging management module 140 may further supply power to the terminal device by using the power management module 141. The power management module 141 is configured to connect to the battery 142, the charging management module 140, and the processor 110. The power management module 141 may further receive input of the battery 142 to supply power to the terminal device.

The terminal device may implement an audio function such as music playing and recording through the audio module 170, the speaker 170A, the receiver 170B, the microphone 170C, the headset jack 170D, the application processor, and the like.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a Mini-LED, a Micro-LED, a Micro-OLED, a quantum dot light emitting diode (quantum dot light emitting diode, QLED), or the like. For example, in this embodiment of this application, the display 194 may be configured to display various display interfaces mentioned in the following embodiments. For example, when the terminal device is a mobile phone, the display 194 may display a home screen of the mobile phone, an FA card center screen, or the like.

The terminal device implements a display function by using the GPU, the display 194, the application processor, and the like. The GPU is a microprocessor for image processing and is connected to the display 194 and the application processor. The GPU is configured to perform mathematical and geometric computation for graphic rendering. The processor 110 may include one or more GPUs that execute program instructions to generate or change display information.

It may be understood that the structure shown in FIG. 1 does not constitute a specific limitation on the terminal device. In some embodiments, the terminal device may alternatively include more or fewer components than those shown in FIG. 1, or some components may be combined, or some components may be split, or there may be a different component layout. Alternatively, some components shown in FIG. 1 may be implemented by hardware, software, or a combination of software and hardware.

In addition, when the terminal device is another device like a large screen (such as a smart screen), a tablet computer, a wearable device (such as a smartwatch or a smart band), a television, a vehicle-mounted device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), and the like, for a specific structure of the another terminal device, refer to FIG. 1. For example, the another terminal device may add or decrease a component based on the structure shown in FIG. 1. Details are not described herein again.

The following describes an icon splicing method provided in an embodiment of this application.

Figure 2:
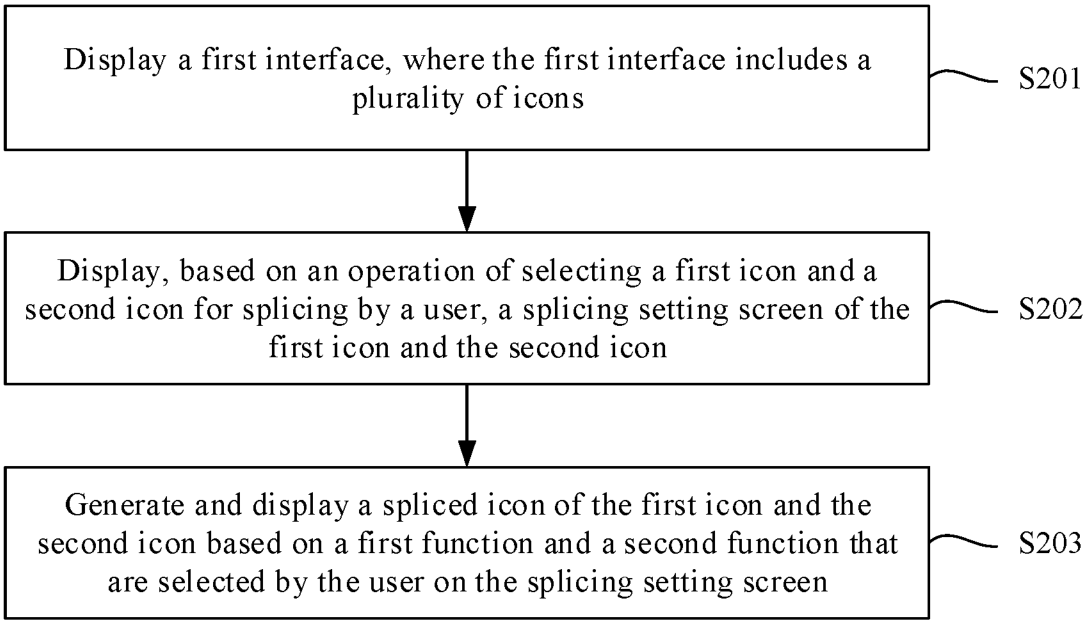
FIG. 2 is a schematic flowchart of an icon splicing method according to an embodiment of this application.

For example, FIG. 2 is a schematic flowchart of an icon splicing method according to an embodiment of this application. In some embodiments, a procedure shown in FIG. 2 may be performed by a terminal device (for example, a mobile phone). As shown in FIG. 2, the icon splicing method may include the following steps.

S201: Display a first interface, where the first interface includes a plurality of icons.

For example, the terminal device may be the mobile phone, and the first interface may be a home screen of the mobile phone.

Figure 3:
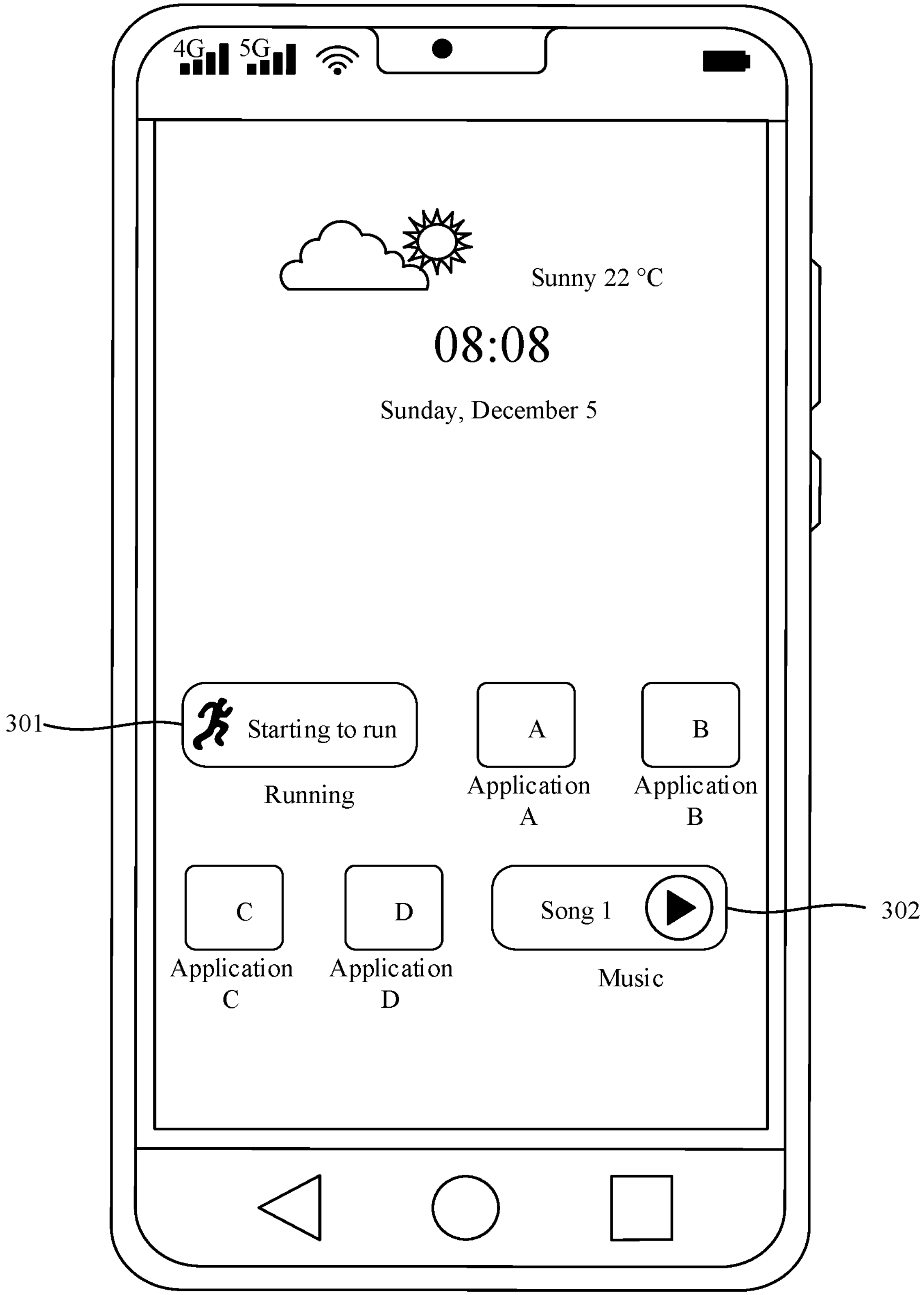
FIG. 3 is a schematic diagram of a home screen of a mobile phone according to an embodiment of this application.

For example, FIG. 3 is a schematic diagram of a home screen of a mobile phone according to an embodiment of this application. As shown in FIG. 3, in a possible scenario, the home screen of the mobile phone may include a plurality of icons such as a running icon 301, a music icon 302, and icons (not numbered) of an application A to an application D. The running icon 301 and the music icon 302 may be FA card icons, and the icons of the application A to the application D may be application icons.

In other words, the terminal device may display a first icon through S201.

S202: Display, in response to an operation of selecting the first icon and a second icon for splicing by a user, a splicing setting screen of the first icon and the second icon.

Each of the first icon and the second icon is one of the plurality of icons in S201.

The icons included in the first interface may include an application icon and/or a card icon. The first icon may be an application icon, or may be an FA card icon. The second icon is different from the first icon, and the second icon may be an application icon, or may be an FA card icon.

For example, the first icon may be the running icon 301 displayed on the home screen of the mobile phone shown in FIG. 3. The second icon may be any icon other than the running icon 301 on the home screen of the mobile phone shown in FIG. 3, for example, any one of the music icon 302 and the icons of the application A to the application D.

In some embodiments, the step of displaying, in response to an operation of selecting the first icon and a second icon for splicing by a user, a splicing setting screen of the first icon and the second icon may include: receiving an operation of touching and holding the first icon; displaying, in response to the operation of touching and holding the first icon, a splicing key corresponding to the first icon; receiving an operation of tapping the splicing key corresponding to the first icon; displaying the first interface again in response to the operation of tapping the splicing key corresponding to the first icon; receiving an operation of touching and holding the second icon; and displaying the splicing setting screen in response to the operation of touching and holding the second icon.

The splicing setting screen may also be referred to as a function selection screen. The splicing setting screen may include options (or referred to as identifier information) of one or more functions corresponding to the first icon, and options of one or more functions corresponding to the second icon. The function corresponding to the first icon is a function supported by an application or an FA card corresponding to the first icon. The function corresponding to the second icon is a function supported by an application or an FA card corresponding to the second icon.

Figure 4:
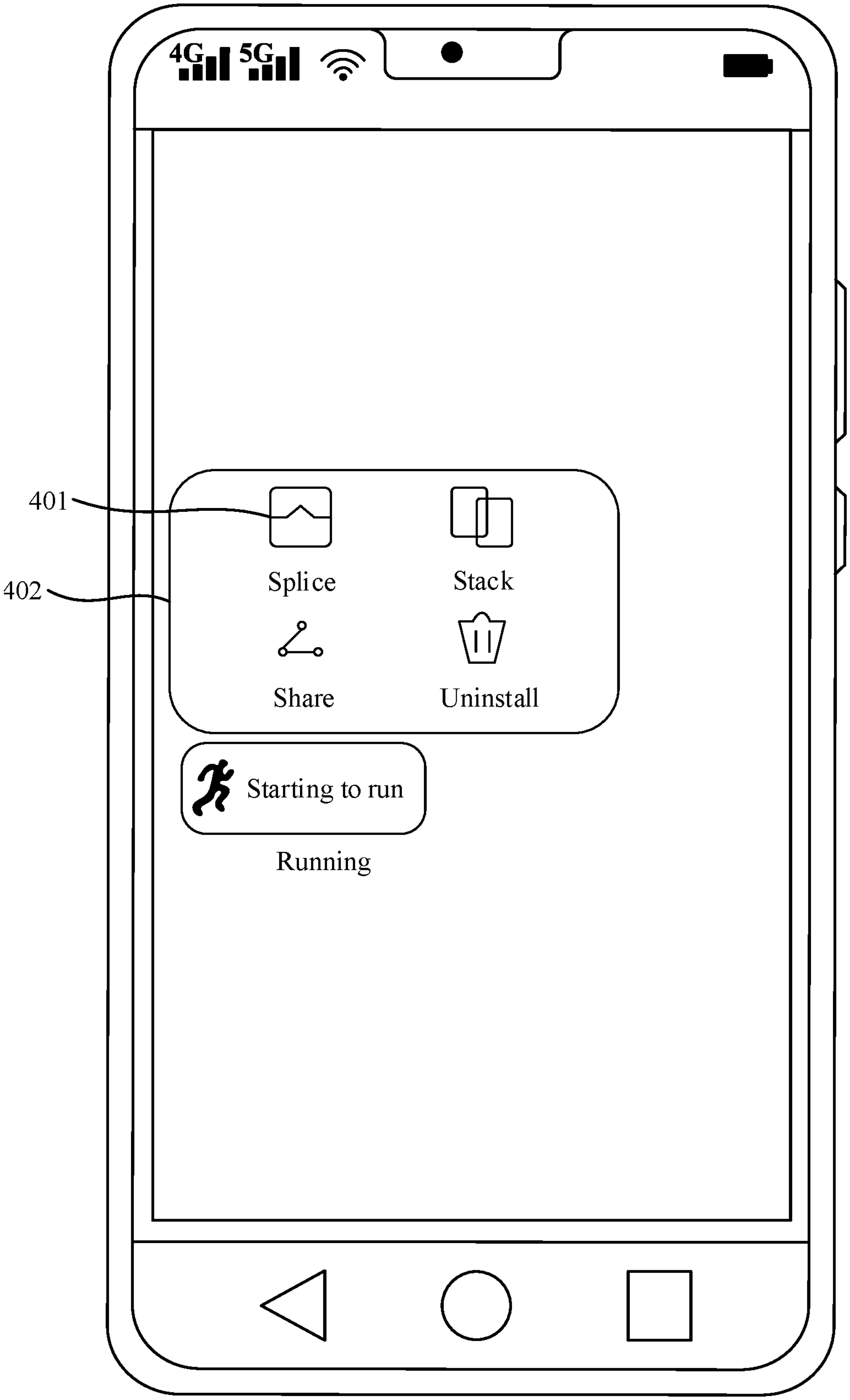
FIG. 4 is a schematic diagram of displaying a splicing key corresponding to a running icon 301 by a mobile phone according to an embodiment of this application.

For example, the first icon is the running icon 301. FIG. 4 is a schematic diagram of displaying a splicing key corresponding to the running icon 301 by the mobile phone according to an embodiment of this application. As shown in FIG. 4, in a possible scenario, after receiving an operation of touching and holding the running icon 301 by the user, the mobile phone may display, in response to the operation of touching and holding the running icon 301, a splicing menu 402 corresponding to the running icon 301. The splicing menu 402 may include a splicing key 401 corresponding to the running icon 301.

Optionally, the splicing menu 402 may further include other keys such as stack, share, and uninstall, and these other keys may separately provide other functions for the user. For example, when the user taps the stack key, a function of stacking the running icon 301 with another icon may be used. When the user taps the share key, a function of sharing an FA card corresponding to the running icon 301 may be used. When the user taps the uninstall key, a function of uninstalling the FA card corresponding to the running icon 301 may be used. The other keys included in the splicing menu 402 and the functions corresponding to the other keys are not limited herein.

In some other possible scenarios, after receiving the operation of touching and holding the running icon 301 by the user, the mobile phone may display, in response to the operation of touching and holding the running icon 301, only the splicing key 401 corresponding to the running icon 301. In other words, the mobile phone may display the splicing key 401 without using the splicing menu 402, which is not limited herein.

In some implementations, a manner in which the mobile phone displays the splicing key 401 corresponding to the running icon 301 may include: The mobile phone directly displays the splicing key 401 corresponding to the running icon 301 (or the splicing menu 402 corresponding to the running icon 301) around (for example, above) the running icon 301 on the home screen of the mobile phone. When another element (for example, another icon or widget (widget)) originally exists in an area used to display the splicing key 401 corresponding to the running icon 301 (or the splicing menu 402 corresponding to the running icon 301) on the home screen of the mobile phone, the splicing key 401 corresponding to the running icon 301 (or the splicing menu 402 corresponding to the running icon 301) may be displayed above the another element that originally exists. For example, the splicing key 401 corresponding to the running icon 301 (or the splicing menu 402 corresponding to the running icon 301) may be displayed in a floating manner relative to the home screen of the mobile phone shown in FIG. 3.

Optionally, in this embodiment, when the mobile phone displays the splicing key 401 corresponding to the running icon 301, fuzzy processing (fuzzy display) may be performed on an element other than the running icon 301 on the home screen of the mobile phone, to highlight the splicing key 401 corresponding to the running icon 301 for the user to operate.

In some other implementations, the manner in which the mobile phone displays the splicing key 401 corresponding to the running icon 301 may alternatively include: The mobile phone displays the splicing key 401 corresponding to the running icon 301 by using a dedicated display interface. The dedicated display interface may include the running icon 301 and the splicing key 401 corresponding to the running icon 301 (or the splicing menu 402 corresponding to the running icon 301). For example, the dedicated display interface may be of a same size as the home screen of the mobile phone shown in FIG. 3. After receiving the operation of touching and holding the running icon 301 by the user, the mobile phone may display, in response to the operation of touching and holding the running icon 301, the dedicated display interface above the home screen of the mobile phone shown in FIG. 3.

After the splicing key 401 corresponding to the running icon 301 shown in FIG. 4 is displayed, the user may tap the splicing key 401 corresponding to the running icon 301. After receiving an operation of tapping the splicing key 401 corresponding to the running icon 301 by the user, the mobile phone may switch, in response to the operation of tapping the splicing key 401 corresponding to the running icon 301, from a display interface shown in FIG. 4 to the home screen of the mobile phone shown in FIG. 3, that is, display the home screen of the mobile phone shown in FIG. 3 again.

Optionally, after the home screen of the mobile phone shown in FIG. 3 is displayed again, the to-be-spliced first icon (for example, the running icon 301) selected by the user may be highlighted, or a related identifier may be displayed, to prompt the user with the selected to-be-spliced icon. For example, the mobile phone may darken or brighten the first icon, or add other display effect, to highlight the first icon. Alternatively, the mobile phone may display a first identifier (for example, the first identifier may be a white box or another identifier) on the first icon, to prompt the user that the first icon is the selected to-be-spliced icon. A specific manner of highlighting the first icon or displaying the related identifier of the first icon is not limited herein.

Further, the user may continue to select another icon (which may be referred to as the second icon) to splice with the running icon 301 on the home screen of the mobile phone shown in FIG. 3. For example, the another icon may be any one of the plurality of icons displayed on the home screen of the mobile phone shown in FIG. 3, such as the music icon 302 and the icons of the application A to the application D.

For example, the second icon is the music icon 302. The user may touch and hold the music icon 302. After receiving the operation of touching and holding the music icon 302, the mobile phone may display, in response to the operation of touching and holding the music icon 302, a splicing setting screen of the running icon 301 and the music icon 302.

Figure 5:
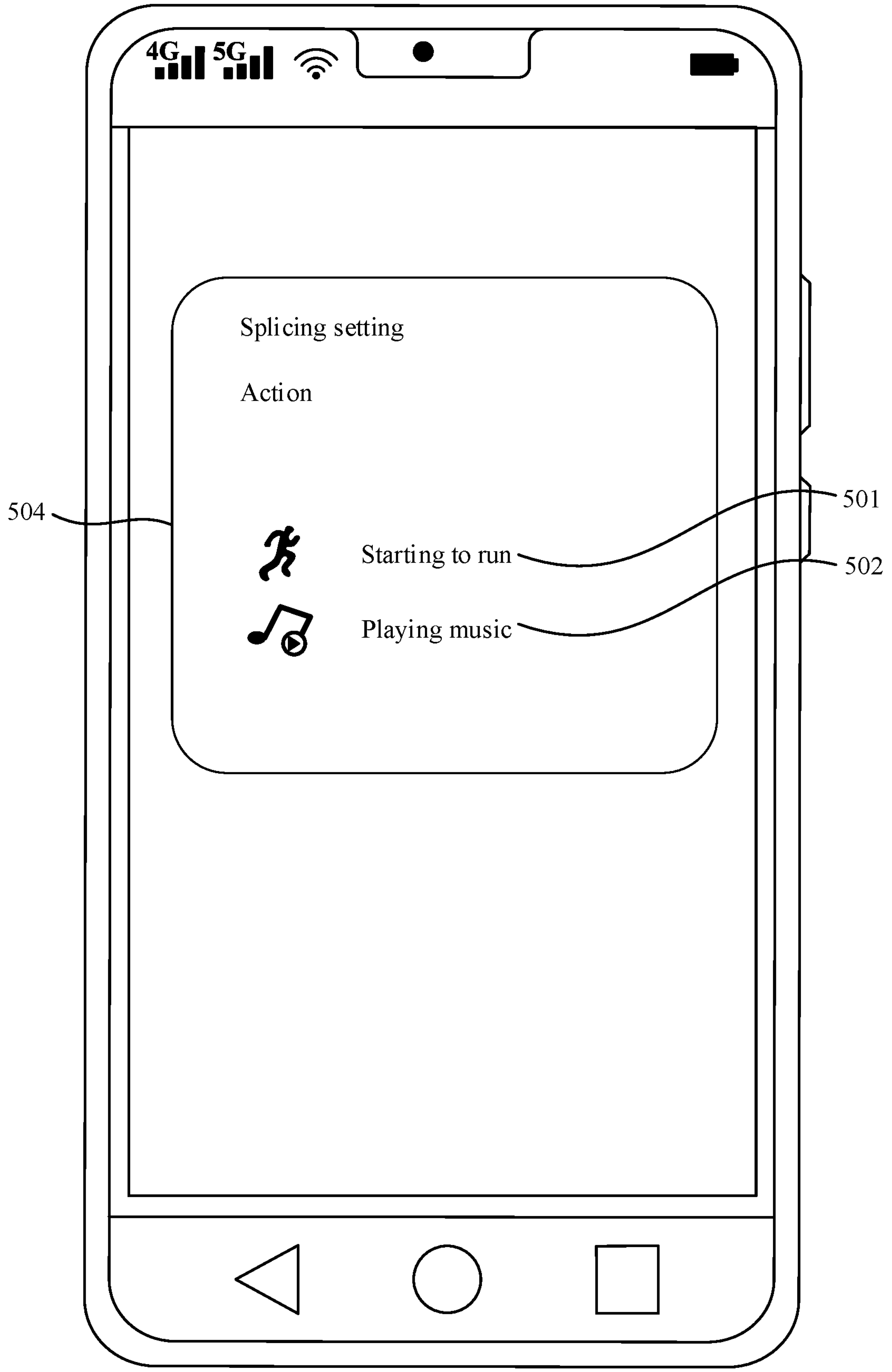
FIG. 5 is a schematic diagram of a splicing setting screen according to an embodiment of this application.

For example, FIG. 5 is a schematic diagram of a splicing setting screen according to an embodiment of this application. As shown in FIG. 5, it is assumed that a function supported by the FA card corresponding to the running icon 301 includes "starting to run", and a function supported by an FA card corresponding to the music icon 302 includes "playing music". The splicing setting screen may include a "starting to run" function option 501 and a "playing music" function option 502.

S203: Generate and display a spliced icon of the first icon and the second icon based on a first function and a second function that are selected by the user on the splicing setting screen.

The generating and displaying a spliced icon of the first icon and the second icon may be first generating the spliced icon, and then displaying the spliced icon, or may be displaying the spliced icon in a generation process. Optionally, the generating and displaying a spliced icon of the first icon and the second icon may further be described as: displaying the spliced icon of the first icon and the second icon. The first function may be a function corresponding to the first icon, and the second function may be a function corresponding to the second icon. Alternatively, the first function may be a function corresponding to the second icon, and the second function may be a function corresponding to the first icon. The spliced icon of the first icon and the second icon may support linkage between the first function and the second function. The spliced icon responds more intelligently to a user interaction action, and user interaction efficiency can be effectively improved.

In some embodiments, when the first function is the function corresponding to the first icon, the step of generating and displaying a spliced icon of the first icon and the second icon based on a first function and a second function that are selected by the user on the splicing setting screen may include: receiving an operation of selecting an option of the first function by the user; displaying, in response to the operation of selecting the option of the first function, an option of the function corresponding to the second icon; receiving an operation of selecting an option of the second function; and generating and displaying, in response to the operation of selecting the option of the second function, the spliced icon of the first icon and the second icon based on the first function and the second function.

Figure 6:
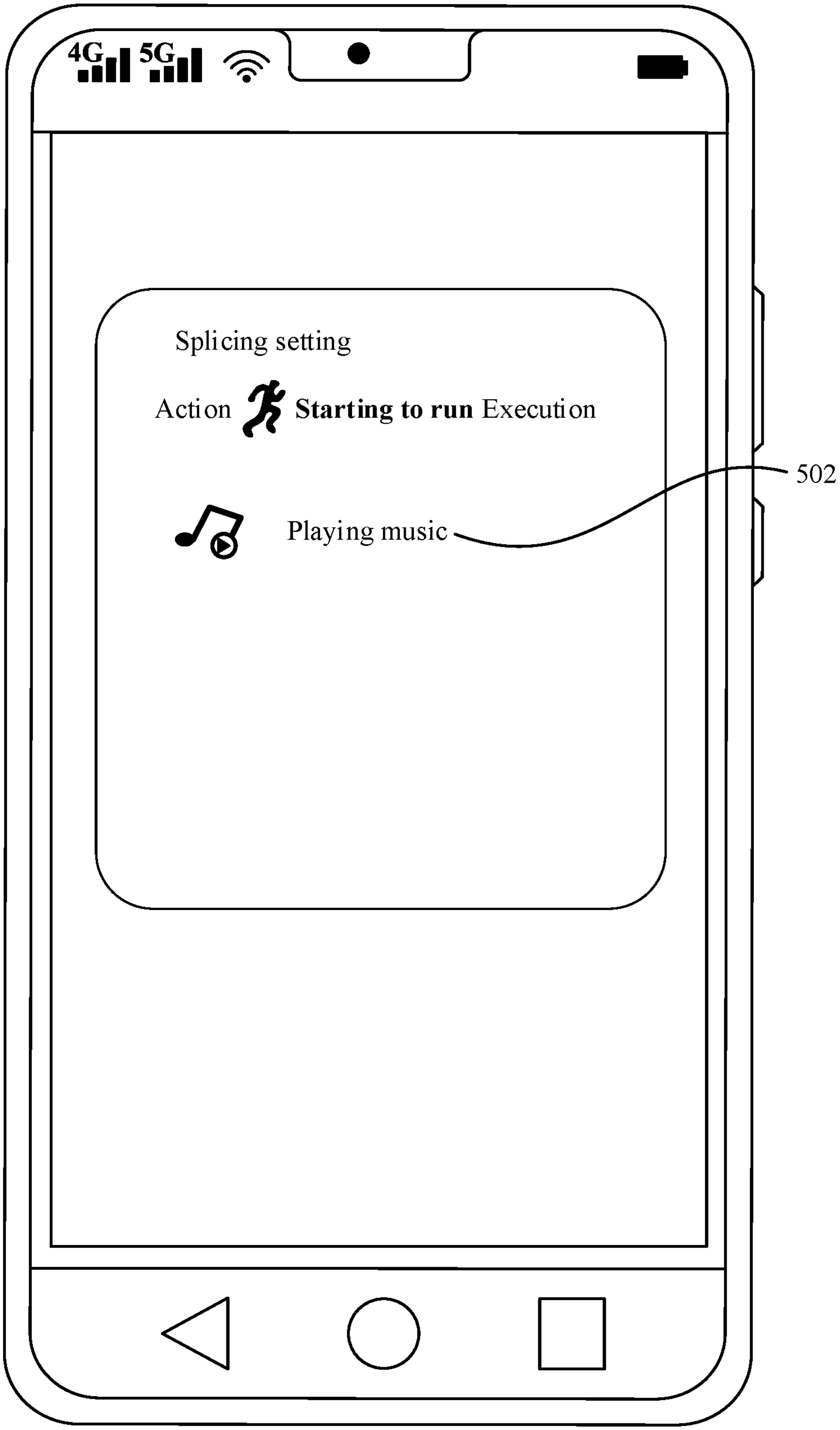
FIG. 6 is another schematic diagram of a splicing setting screen according to an embodiment of this application.

The splicing setting screen shown in FIG. 5 is used as an example. The first function may be "starting to run", and the second function may be "playing music". For example, the user may tap the "starting to run" function option 501 on the splicing setting screen shown in FIG. 5. After receiving the operation of tapping the "starting to run" function option 501 by the user, the mobile phone may display, in response to the operation of tapping the "starting to run" function option 501, a function option corresponding to the music icon 302. FIG. 6 is another schematic diagram of a splicing setting screen according to an embodiment of this application. In a possible implementation, as shown in FIG. 6, the mobile phone may update the splicing setting screen, and an updated splicing setting screen may include only the "playing music" function option 502 for the user to select. The user may tap the "playing music" function option 502 on the splicing setting screen shown in FIG. 6. The mobile phone may generate and display, in response to the operation of tapping the "playing music" function option 502 by the user, a spliced icon of the running icon 301 and the music icon 302 based on "starting to run" and "playing music". In another possible implementation, there may be a plurality of options of functions corresponding to the music icon 302.

In some other embodiments, when there is only one option (for example, the first icon is only an FA card corresponding to a single function) of the function corresponding to the first icon (the application or the FA card corresponding to the first icon supports only one function), or when the first icon has a default first function used for splicing (for example, the "starting to run" function corresponding to the first icon is the default function that can be used for splicing), the splicing setting screen of the first icon (for example, the running icon 301) and the second icon (for example, the music icon 302) displayed by the mobile phone may alternatively include only options of the one or more functions corresponding to the second icon. The first function may be only one function supported by the application or the FA card corresponding to the first icon, or the default splicing function, and the second function may be a function supported by the application or the FA card corresponding to the second icon selected by the user on the splicing setting screen. In other words, S203 may also be replaced with: Generate and display a spliced icon of the first icon and the second icon based on the second function selected by the user on the splicing setting screen, and the first function supported by the application or the FA card corresponding to the first icon or the default first function used for splicing (the splicing function). For example, the mobile phone may receive the operation of selecting the option of the second function by the user, and in response to the operation of selecting the option of the second function, generate and display the spliced icon of the first icon and the second icon based on the first function supported by the application or the FA card corresponding to the first icon, or the default first function used for splicing, and the second function. When the application or the FA card corresponding to the first icon supports only one function, the function may be further considered as the default first function used for splicing.

For example, it is assumed that the function supported by the FA card corresponding to the running icon 301 includes only "starting to run", and the function supported by the FA card corresponding to the music icon 302 includes "playing music". After receiving the operation of touching and holding the music icon 302, the mobile phone may display, in response to the operation of touching and holding the music icon 302, the splicing setting screen of the running icon 301 and the music icon 302. The splicing setting screen may be directly shown in FIG. 6, "playing music" is provided for the user to select as the second function, and the first function is directly set as "starting to run" by default. Optionally, the mobile phone may display the spliced icon of the first icon and the second icon on the first interface. The mobile phone may enable the first function in response to an operation of tapping the spliced icon of the first icon and the second icon by the user, and enable the second function in linkage.

Figure 7:
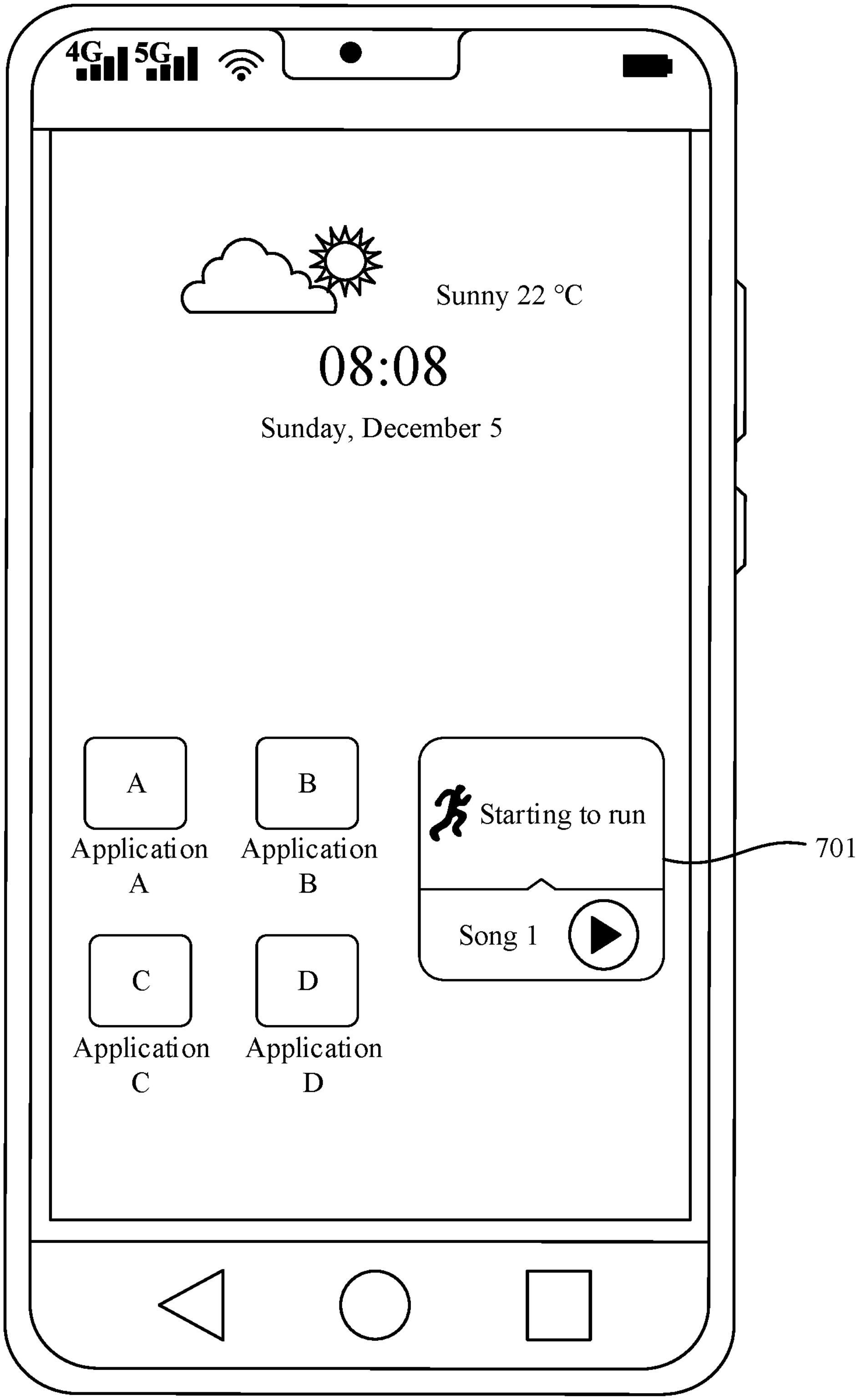
FIG. 7 is another schematic diagram of a home screen of a mobile phone according to an embodiment of this application.

For example, FIG. 7 is another schematic diagram of a home screen of a mobile phone according to an embodiment of this application. As shown in FIG. 7, the mobile phone may display a spliced icon 701 of the running icon 301 and the music icon 302 on the home screen of the mobile phone. The spliced icon 701 may include a pattern of the running icon 301 and a pattern of the music icon 302. After the user taps the spliced icon 701, the mobile phone may enable the "starting to run" function in response to the operation of tapping the spliced icon 701 by the user, and enable the "playing music" function in linkage. For example, the mobile phone may start to record running information and play music at the same time.

It can be learned that the icon splicing method provided in this embodiment of this application splices icons in terms of presentation effect, and implements splicing and linkage between functions corresponding to the icons.

In the examples provided in FIG. 5 to FIG. 7, enabling the "starting to run" function may be considered as one trigger action, and enabling the "playing music" function may be considered as one execution action. When the "starting to run" function is enabled, the mobile phone may detect the trigger action, and the trigger action may trigger the mobile phone to perform the execution action, namely enabling the "playing music" function. An operation of selecting the "starting to run" function option 501 by the user may be considered as an operation of selecting the trigger action, and an operation of selecting the "playing music" function option 502 by the user may be considered as an operation of selecting the execution action.

Optionally, still refer to FIG. 5. When the user selects the "starting to run" function option 501, the splicing setting screen may further prompt, by using text information "action", that the trigger action is currently selected by the user. The text information "action" herein may alternatively be replaced with "trigger action" or another text. This is not limited.

Still refer to FIG. 6. When the user selects the "playing music" function option 502, the splicing setting screen may further prompt, by using text information "execution", that the execution action is currently selected by the user. The text information "execution" herein may alternatively be replaced with "execution action" or another text, which is not limited either. Before the text information "execution", identifiers of "action" and "starting to run" may be further displayed, to prompt the user that the enabling the "starting to run" function is selected as the trigger action.

Figure 8:
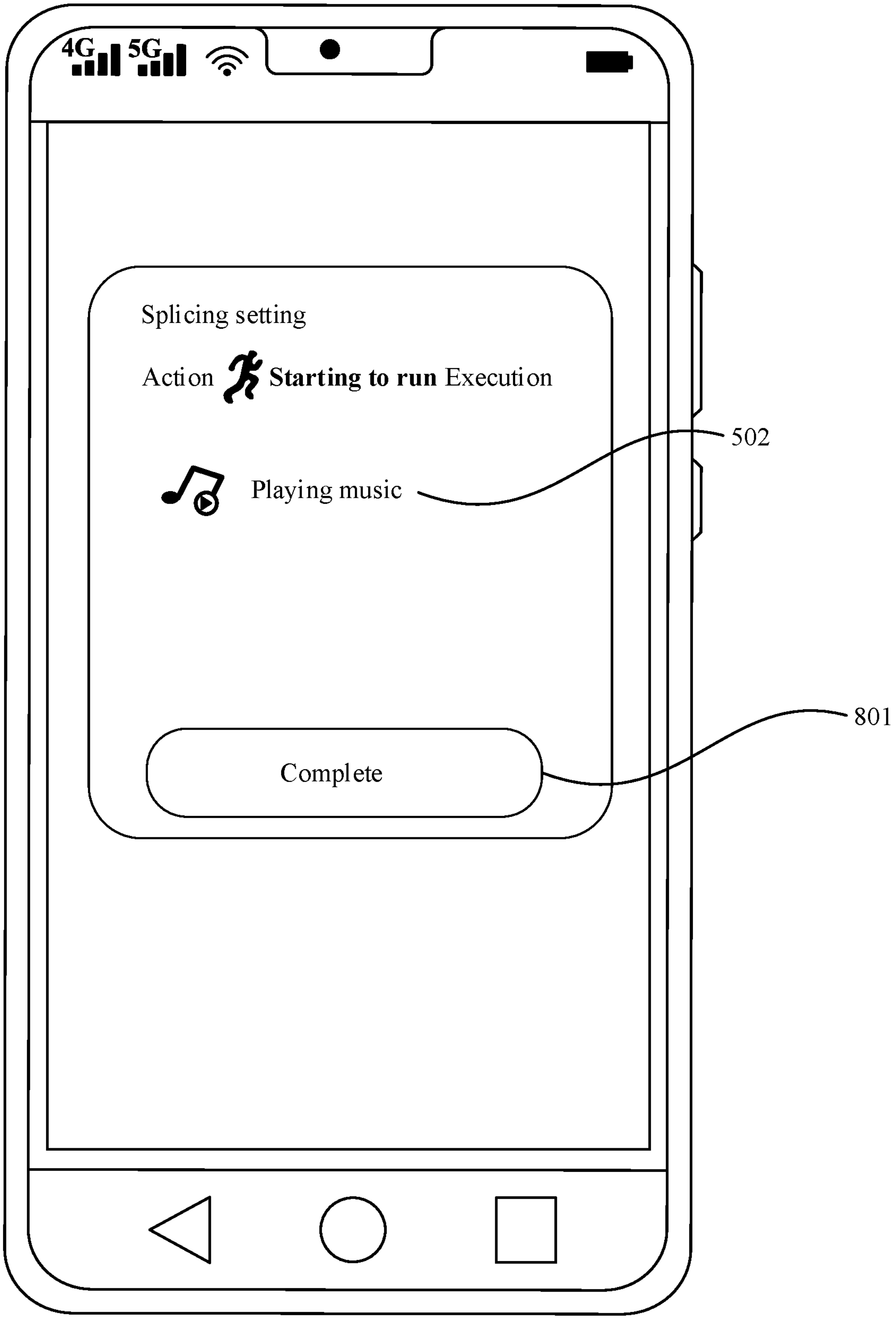
FIG. 8 is still another schematic diagram of a splicing setting screen according to an embodiment of this application.

FIG. 8 is still another schematic diagram of a splicing setting screen according to an embodiment of this application. Optionally, as shown in FIG. 8, in some implementations, based on the splicing setting screen shown in FIG. 6, the splicing setting screen may further include a complete key 801. After tapping the "playing music" function option 502, the user further needs to tap the complete key 801. After the mobile phone receives the operation of tapping the "playing music" function option 502 and an operation of tapping the complete key 801 by the user, the mobile phone may generate and display, in response to the operations, a spliced icon of the running icon 301 and the music icon 302 based on "starting to run" and "playing music".

In some other embodiments, when the first function is the function corresponding to the second icon, the step of generating and displaying a spliced icon of the first icon and the second icon based on a first function and a second function that are selected by the user on the splicing setting screen may include: receiving an operation of selecting an option of the first function by the user; displaying, in response to the operation of selecting the option of the first function, an option of the function corresponding to the first icon; receiving an operation of selecting an option of the second function; and generating and displaying, in response to the operation of selecting the option of the second function, the spliced icon of the first icon and the second icon based on the first function and the second function. For a specific principle, refer to the examples provided in the foregoing embodiment, and details are not described again.

Optionally, the foregoing operation of touching and holding the first icon may alternatively be replaced with an operation of double tapping the first icon, an operation of tapping the first icon for a plurality of times, or the like. The foregoing operation of touching and holding the second icon may alternatively be replaced with an operation of double tapping the second icon, an operation of tapping the second icon for a plurality of times, or the like. A manner of selecting the first icon, a manner of selecting the second icon, and the like are not limited in this application.

Optionally, when the mobile phone displays the first interface (for example, the home screen of the mobile phone) again in response to the operation of tapping the splicing key corresponding to the first icon (for example, the running icon 301), the foregoing operation of touching and holding the second icon may be further replaced with an operation of tapping the second icon (once). That is, when the user taps an icon on the home screen of the mobile phone once, the mobile phone is usually triggered to start an application or an FA card corresponding to the icon. However, when the mobile phone displays the home screen of the mobile phone again in response to the operation of tapping the splicing key corresponding to the first icon, if the user taps the icon on the home screen of the mobile phone once, the mobile phone is triggered to select the icon as the second icon and display the splicing setting screen.

In this application, the operation of selecting the first icon (for example, touching and holding the first icon) by the user, the operation of tapping the splicing key corresponding to the first icon, and the like may be considered as an operation of triggering splicing of the first icon. The operation may be referred to as a first operation. In other words, the terminal device may display the second icon in response to the first operation. Then, an operation of selecting the second icon (for example, touching and holding the second icon) by the user may be considered as an operation of selecting the second icon and the first icon for splicing, and the operation may be referred to as a second operation. In other words, the terminal device may display, in response to the second operation, options of a plurality of functions corresponding to the second icon (for example, display the splicing setting screen). The terminal device may display, in response to the operation of selecting the option of the second function by the user, the spliced icon of the first icon and the second icon. The spliced icon has a function of supporting linkage between the first function and the second function. The first function includes one or more of a plurality of functions corresponding to the first icon.

The following describes a layout relationship between the first icon and the second icon in the spliced icon of the first icon and the second icon.

In this embodiment of this application, the spliced icon may include a subelement 1 and a subelement 2. The subelement 1 may be referred to as a main card icon, and the subelement 2 may be referred to as a triggered card icon. The layout of the spliced icon may be referred to as a parent layout. The main card icon may be an icon corresponding to the first function, and the triggered card icon may be an icon corresponding to the second function.

Figure 9:
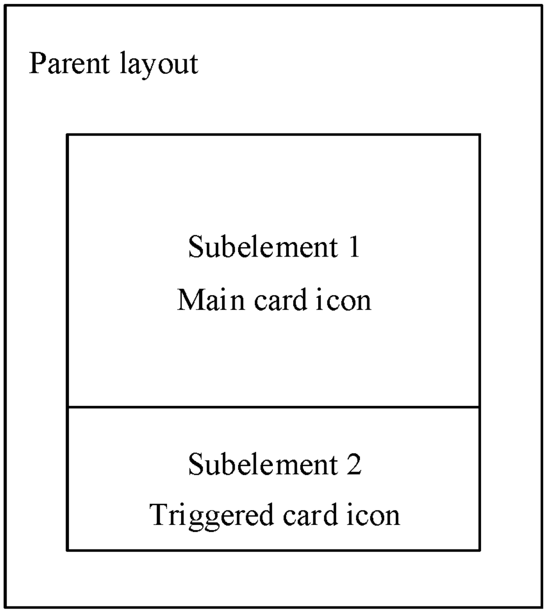
FIG. 9 is a schematic diagram of a layout of a spliced icon according to an embodiment of this application.

FIG. 9 is a schematic diagram of a layout of a spliced icon according to an embodiment of this application. As shown in FIG. 9, in an implementation, in the parent layout, the main card icon and the triggered card icon may be arranged in a top-down layout. For example, the main card icon may be located above or below the triggered card icon. FIG. 9 uses an example in which the main card icon is located above the triggered card icon.

For example, in the parent layout of the spliced icon 701 of the running icon 301 and the music icon 302 shown in FIG. 7, the card icon may be the running icon 301, the triggered card icon may be the music icon 302, and the running icon 301 may be located above the music icon 302.

Figure 10:
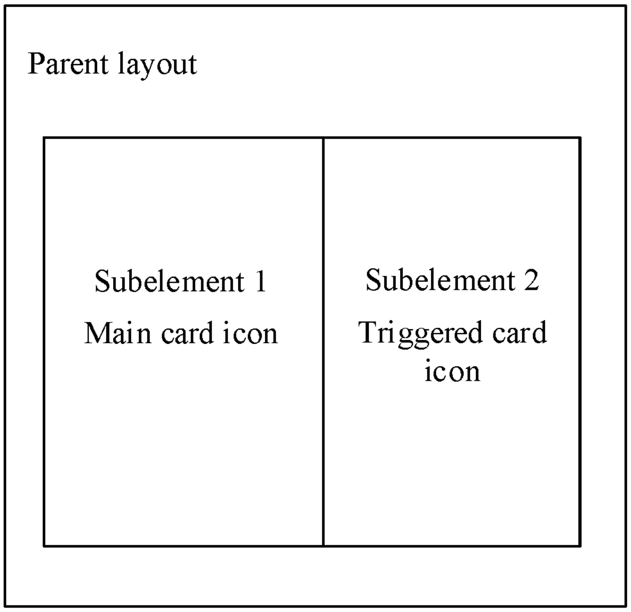
FIG. 10 is another schematic diagram of a layout of a spliced icon according to an embodiment of this application.

FIG. 10 is a schematic diagram of another layout of the spliced icon according to an embodiment of this application. As shown in FIG. 10, in another implementation, in the parent layout, the main card icon and the triggered card icon may be arranged in a left-right layout. For example, the main card icon may be on the left or right of the triggered card icon. FIG. 10 uses an example in which the main card icon is located on the left of the triggered card icon.

A relative location relationship between the main card icon and the triggered card icon in the parent layout is not limited in this application.

In some embodiments, the user may further touch, hold, and drag the main card icon or the triggered card icon in the spliced icon, to modify the relative location relationship between the main card icon and the triggered card icon in the parent layout.

For example, the main card icon is located above the triggered card icon. The user may touch, hold, and drag the main card icon below the triggered card icon. The terminal device may adjust, in response to the operation of dragging the main card icon to below the triggered card icon by the user, the layout of the spliced icon, so that the main card icon is located below the triggered card icon. Alternatively, the user may touch, hold, and drag the triggered card icon above the main card icon. The terminal device may adjust, in response to the operation of dragging the triggered card icon above the main card icon by the user, the layout of the spliced icon, so that the main card icon is located below the triggered card icon.

Similarly, for the main card icon and the triggered card icon in the left-right layout, the user may also touch, hold, and drag the main card icon or the triggered card icon in the spliced icon, to modify the relative location relationship between the main card icon and the triggered card icon in the parent layout.

In other words, the terminal device may receive the operation of dragging the main card icon or the triggered card icon by the user, and adjust the relative location relationship between the main card icon and the triggered card icon in the layout.

Optionally, when generating the spliced icon, the terminal device may obtain a current screen form, determine, based on the current screen form, that the relative location relationship between the main card icon and the triggered card icon in the layout is a left-right layout or a top-down layout, and generate a spliced icon of a corresponding layout based on a determining result.

For example, the terminal device may include a display. When generating the spliced icon, the terminal device may first obtain that a current screen form of the display is in a landscape state or a portrait state. When the screen form is in the landscape state, an aspect ratio of a screen is usually greater than 1, and the terminal device may determine that the relative location relationship between the main card icon and the triggered card icon in the layout is the left-right layout. When the screen form is in the portrait mode, an aspect ratio of a screen is usually less than 1, and the terminal device may determine that the relative location relationship between the main card icon and the triggered card icon in the layout is the top-down layout.

In some embodiments, display colors of the main card icon and the triggered card icon in the spliced icon may be different. A display color of the parent layout may be a gradient color from a dominant color of the main card icon to a dominant color of the triggered card icon. Alternatively, a display color of the parent layout may be a gradient color from a dominant color of the triggered card icon to a dominant color of the main card icon. The display color of the parent layout is a background color of the main card icon and a background color of the triggered card icon shown when displayed.

In some embodiments, an area occupied by the main card icon in the spliced icon may be the same as or different from an area occupied by the triggered card icon. This is not limited herein.

Optionally, when the area occupied by the main card icon in the spliced icon is different from the area occupied by the triggered card icon, the area occupied by the main card icon may be greater than the area occupied by the triggered card icon. For example, the area occupied by the main card icon may occupy two-thirds of an area of the entire spliced icon, and an area occupied by the triggered card icon may occupy one-third of the area of the entire spliced icon.

The area occupied by the main card icon is greater than the area occupied by the triggered card icon, so that a specific icon may be more intuitively fed back to the user as the main card icon.

It should be noted that a relative size of the area occupied by the main card icon and a relative size of the area occupied by the triggered card icon are not limited in this application.

Optionally, in a possible implementation, when displaying the spliced icon on the first interface, the terminal device may delete or hide the original first icon and the original second icon. In another possible implementation, when displaying the spliced icon on the first interface, the terminal device may alternatively display both the original first icon and the original second icon. This is not limited herein.

Optionally, when displaying the spliced icon on the first interface, the terminal device may choose to display the spliced icon in an idle area.

For example, when the first interface is the home screen, the first interface may include one home screen and one or more other screens. The home screen and the other screens each may include an application icon and/or a card. When there is an idle area that may be used to display the spliced icon on the home screen, the terminal device may preferentially display the spliced icon in the idle area on the home screen. When there is no idle area that may be used to display the spliced icon (for example, an area for displaying the spliced icon is insufficient) on the home screen, the terminal device may display the spliced icon in an idle area on another screen.

The foregoing embodiment uses an example in which the first icon is the running icon 301, the first function is "starting to run", the second icon is the music icon 302, and the second function is "playing music", to show a case in which each of the first function and the second function is one function. In some other examples, the first function and the second function that are selected by the user on the splicing setting screen may be one or more functions, which are separately described below.

Figure 11:
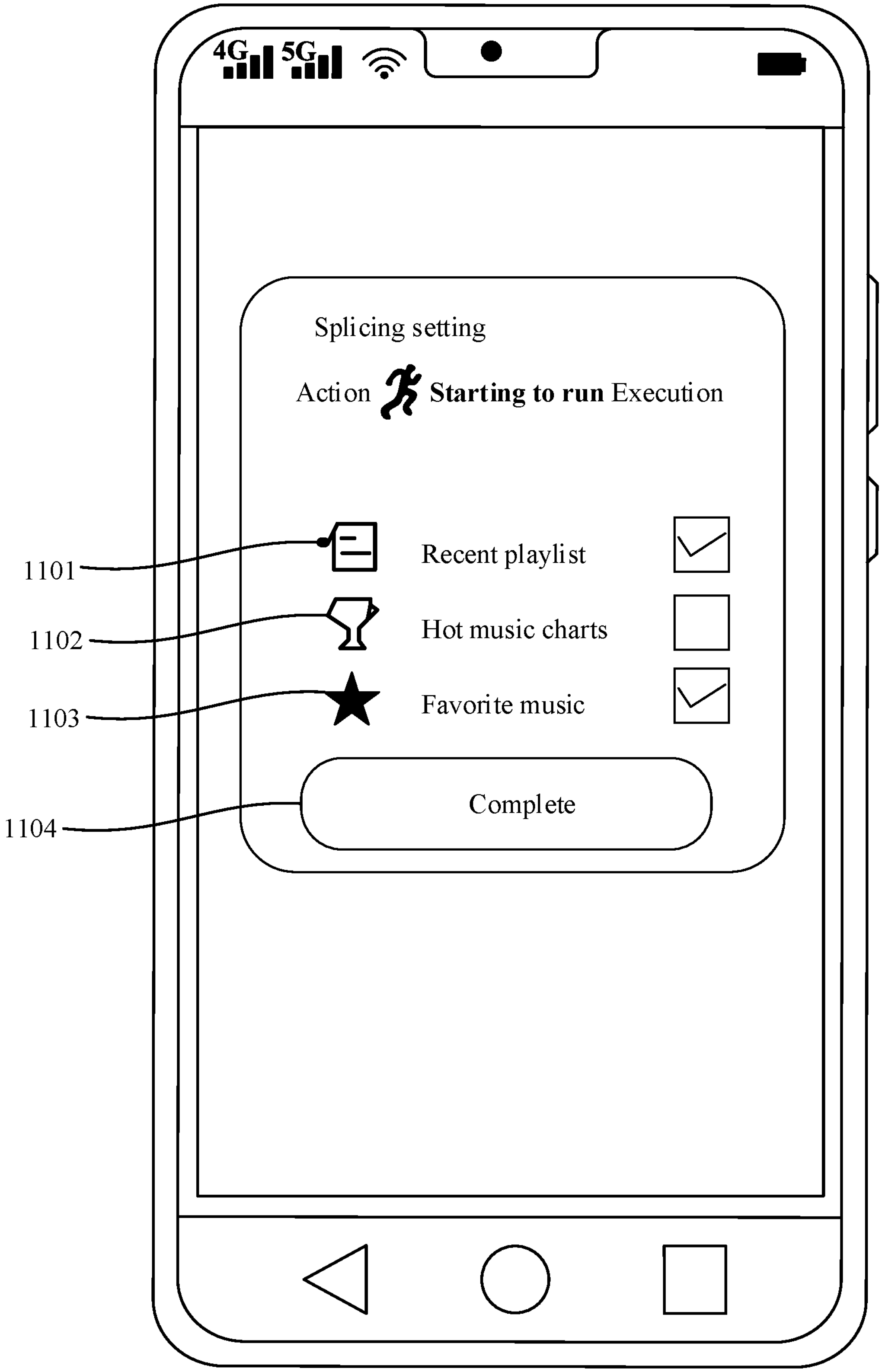
FIG. 11 is still another schematic diagram of a splicing setting screen according to an embodiment of this application.

For example, in a possible scenario, the first function may be one function, and the second function may include a plurality of functions. For example, the first icon is the running icon 301, and the second icon is the music icon 302. For example, the function supported by the FA card corresponding to the running icon 301 may include the "starting to run", and the function supported by the FA card corresponding to the music icon 302 may include the "playing music". However, the "playing music" may include a plurality of functions such as "playing a recent list", "playing hot music charts", and "playing favorite music". After the mobile phone receives the operation of tapping the "starting to run" function option 501 by the user, the splicing setting screen shown in FIG. 6 may be displayed in response to the operation of tapping the "starting to run" function option 501. The splicing setting screen may include only the "playing music" function option 502. Alternatively, as described in the foregoing embodiment, after receiving the operation of touching and holding the music icon 302, the mobile phone may display, in response to the operation of touching and holding the music icon 302, the splicing setting screen shown in FIG. 6. The user may tap the "playing music" function option 502 on the splicing setting screen shown in FIG. 6. FIG. 11 is still another schematic diagram of a splicing setting screen according to an embodiment of this application. As shown in FIG. 11, the mobile phone may display, in response to the operation of tapping the "playing music" function option 502 by the user, a "playing a recent list" function option 1101, a "playing hot music charts" function option 1102, a "playing favorite music" function option 1103, and a complete key 1104. Each of the "playing a recent list" function option 1101, the "playing hot music charts" function option 1102, and the "playing favorite music" function option 1103 may include one selection box. The user may select one or more function options. When the user selects a specific function option, a tick is displayed in a selection box next to the function option to prompt that the function option is selected. The user may select one or more from the "playing a recent list" function option 1101, the "playing hot music charts" function option 1102, and the "playing favorite music" function option 1103, and tap the complete key 1104. In response to the operation, the mobile phone may generate and display a spliced icon of the running icon 301 and the music icon 302 based on "starting to run" and functions corresponding to the function options selected by the user from the "playing a recent list" function option 1101, the "playing hot music charts" function option 1102, and the "playing favorite music" function option 1103.

The spliced icon may support linkage between "starting to run" and the functions corresponding to the one or more function options selected by the user from the "playing a recent list" function option 1101, the "playing hot music charts" function option 1102, and the "playing favorite music" function option 1103.

For example, after the user selects the "playing a recent list" function option 1101 and the "playing favorite music" function option 1103, and taps the complete key 1104, the spliced icon generated by the mobile phone may support linkage among functions such as the "starting to run", the "playing a recent list", and the "playing favorite music". For example, when the user taps the spliced icon, the mobile phone may start to record running information and play music at the same time. When playing music, the mobile phone may sequentially play music from two music lists: a recent list and a favorite music list.

Optionally, after receiving the operation of tapping the "starting to run" function option 501 (or the operation of touching and holding the music icon 302) by the user, the mobile phone may directly display, in response to the operation of tapping the "starting to run" function option 501 (or the operation of touching and holding the music icon 302), the splicing setting screen shown in FIG. 11 for the user to select. This is not limited herein.

For example, in another possible scenario, the second function may be one function, and the first function may include a plurality of functions. For example, the "playing music" in the foregoing example may be used as the first function, and the "starting to run" may be used as the second function. Details are not described herein again.

Figure 12:
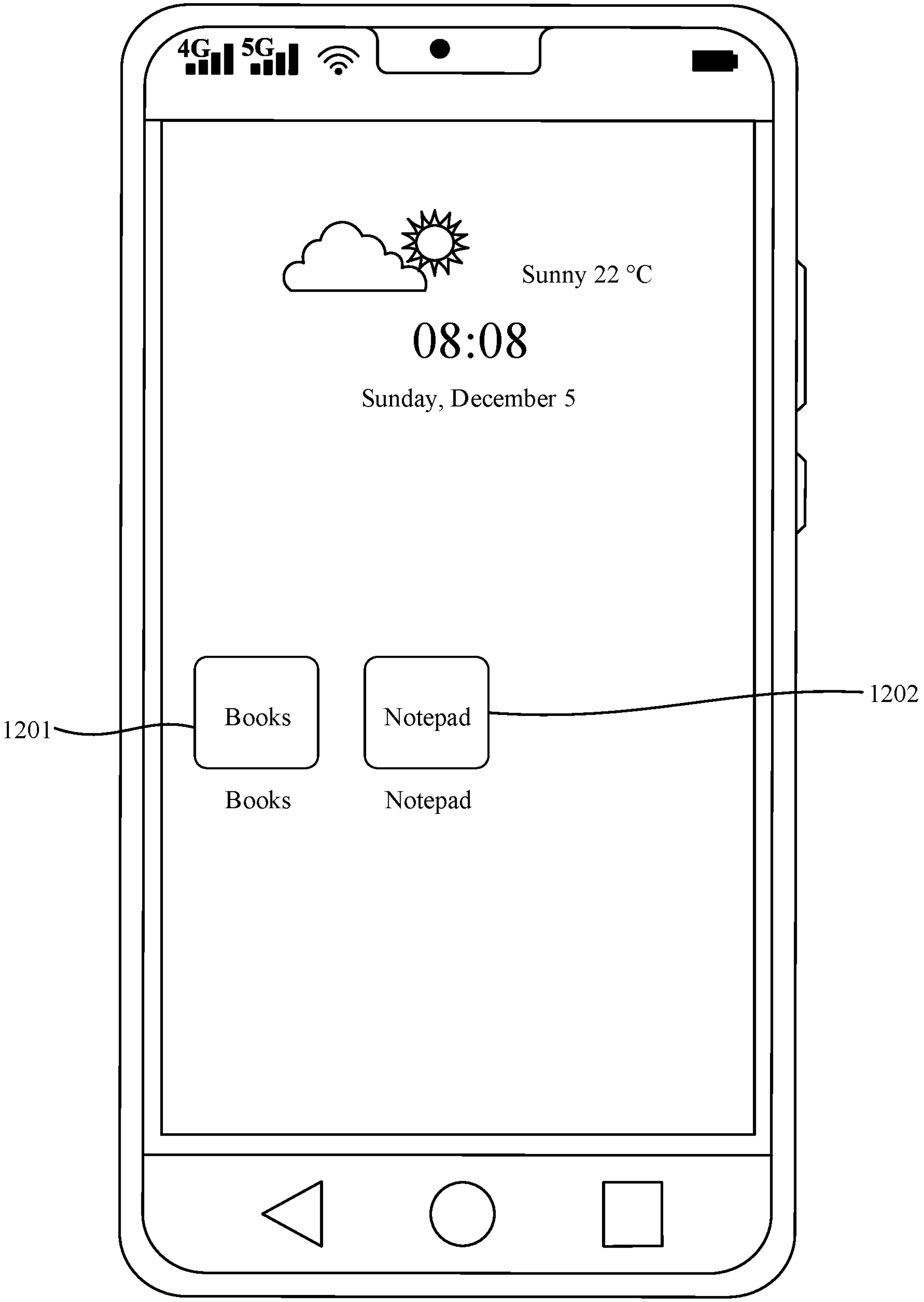
FIG. 12 is still another schematic diagram of a home screen of a mobile phone according to an embodiment of this application.
Figure 13:
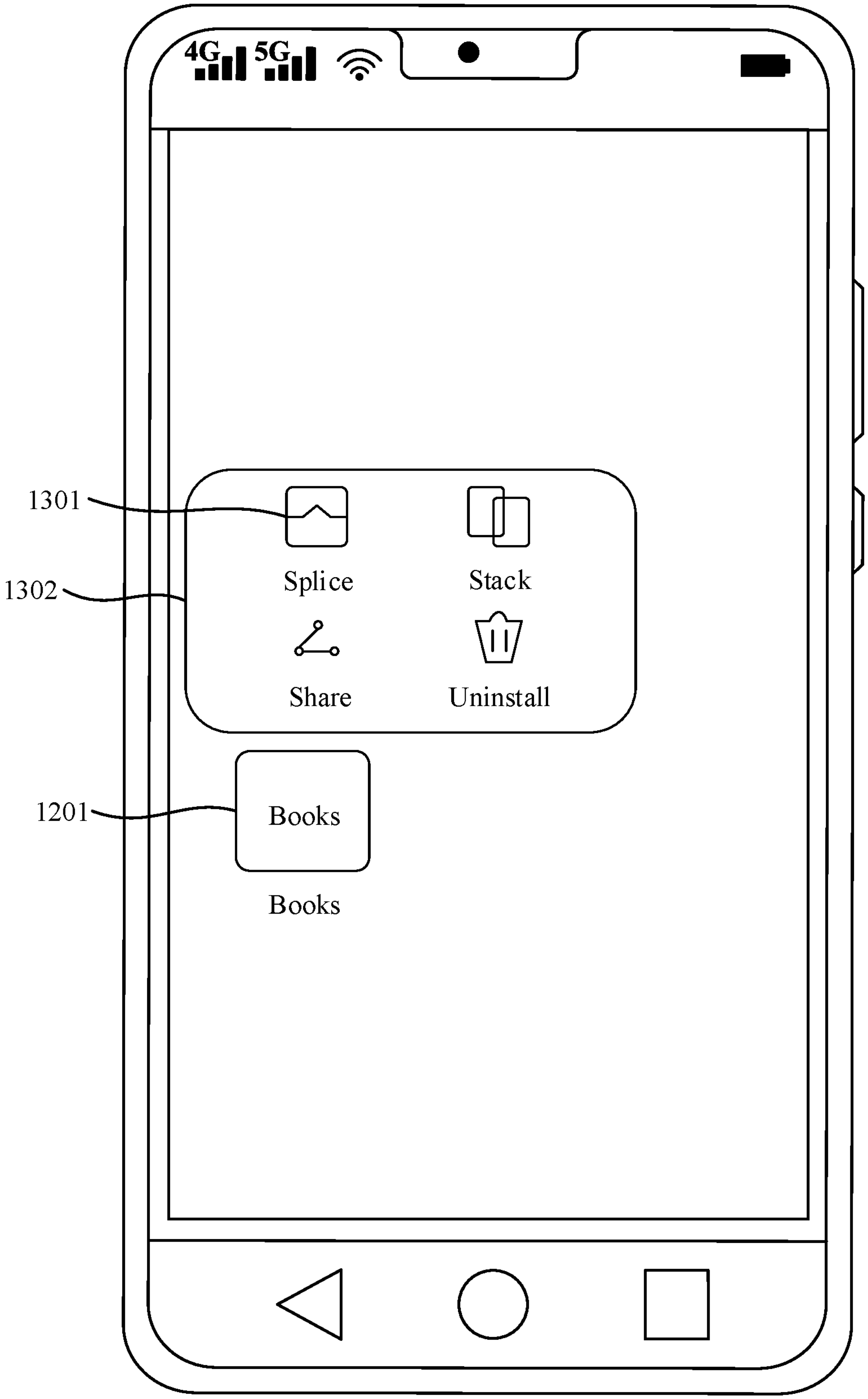
FIG. 13 is a schematic diagram of displaying a splicing key corresponding to a books icon 1201 by a mobile phone according to an embodiment of this application.

For example, in still another possible scenario, the first function may include a plurality of functions, and the second function may also include a plurality of functions. For example, FIG. 12 is still another schematic diagram of a home screen of a mobile phone according to an embodiment of this application. As shown in FIG. 12, the home screen of the mobile phone may include a books icon 1201 and a notepad icon 1202. For example, a first icon is the books icon 1201. FIG. 13 is a schematic diagram of displaying a splicing key corresponding to a books icon 1201 by a mobile phone according to an embodiment of this application. As shown in FIG. 13, after receiving an operation of selecting the books icon 1201 by a user, the mobile phone may display, in response to the operation of selecting the books icon 1201, a splicing menu 1302 corresponding to the books icon 1201. The splicing menu 1302 may include a splicing key 1301 corresponding to the books icon 1201. The user may tap the splicing key 1301 corresponding to the books icon 1201. After receiving the operation of tapping the splicing key 1301 corresponding to the books icon 1201 by the user, the mobile phone may switch, in response to the operation of tapping the splicing key 1301 corresponding to the books icon 1201, from a display interface shown in FIG. 13 to the home screen of the mobile phone shown in FIG. 12, that is, display the home screen of the mobile phone shown in FIG. 12 again.

Figure 14:
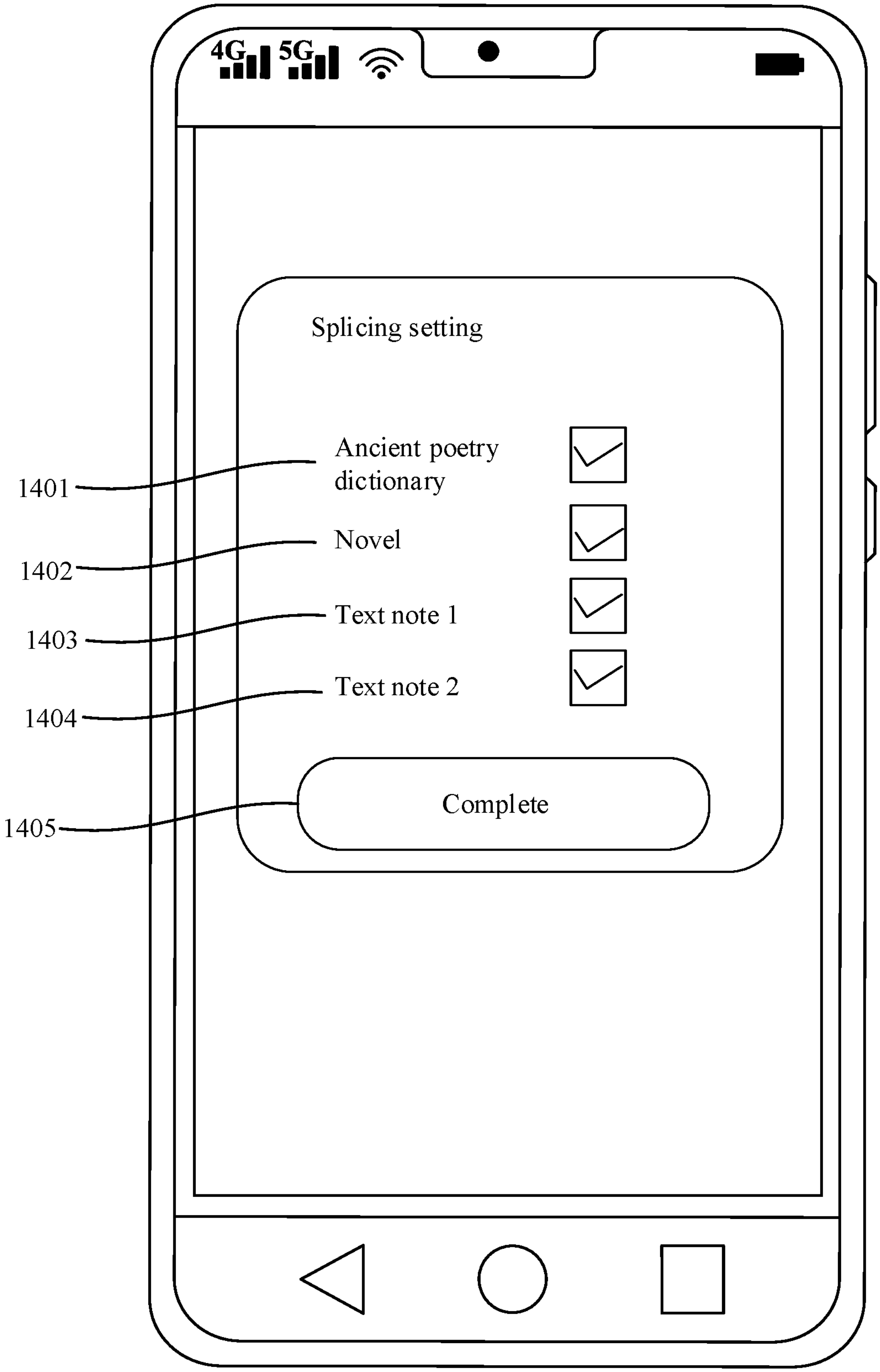
FIG. 14 is still another schematic diagram of a splicing setting screen according to an embodiment of this application.

After the home screen of the mobile phone shown in FIG. 12 is displayed again, the user may continue to select, on the home screen of the mobile phone shown in FIG. 12, the notepad icon 1202 as a second icon to splice with the books icon 1201. The mobile phone may display a splicing setting screen of the books icon 1201 and the notepad icon 1202 in response to the operation of selecting the notepad icon 1202 by the user. FIG. 14 is still another schematic diagram of a splicing setting screen according to an embodiment of this application. As shown in FIG. 14, it is assumed that functions supported by a reading application corresponding to the books icon 1201 include "reading an ancient poetry dictionary" and "reading a novel", and functions supported by an application corresponding to the notepad icon 1202 include "text note 1" and "text note 2". The splicing setting screen may include: a "reading an ancient poetry dictionary" function option 1401, a "reading a novel" function option 1402, a "text note 1" function option 1403, a "text note 2" function option 1404, and one complete key 1405.

A user may select one or more from the "reading an ancient poetry dictionary" function option 1401, the "reading a novel" function option 1402, the "text note 1" function option 1403, and the "text note 2" function option 1404 and tap the complete key 1405. In response to the operations, a mobile phone may generate and display a spliced icon of the books icon 1201 and the notepad icon 1202 based on functions corresponding to the function options selected by the user.

Figure 15:
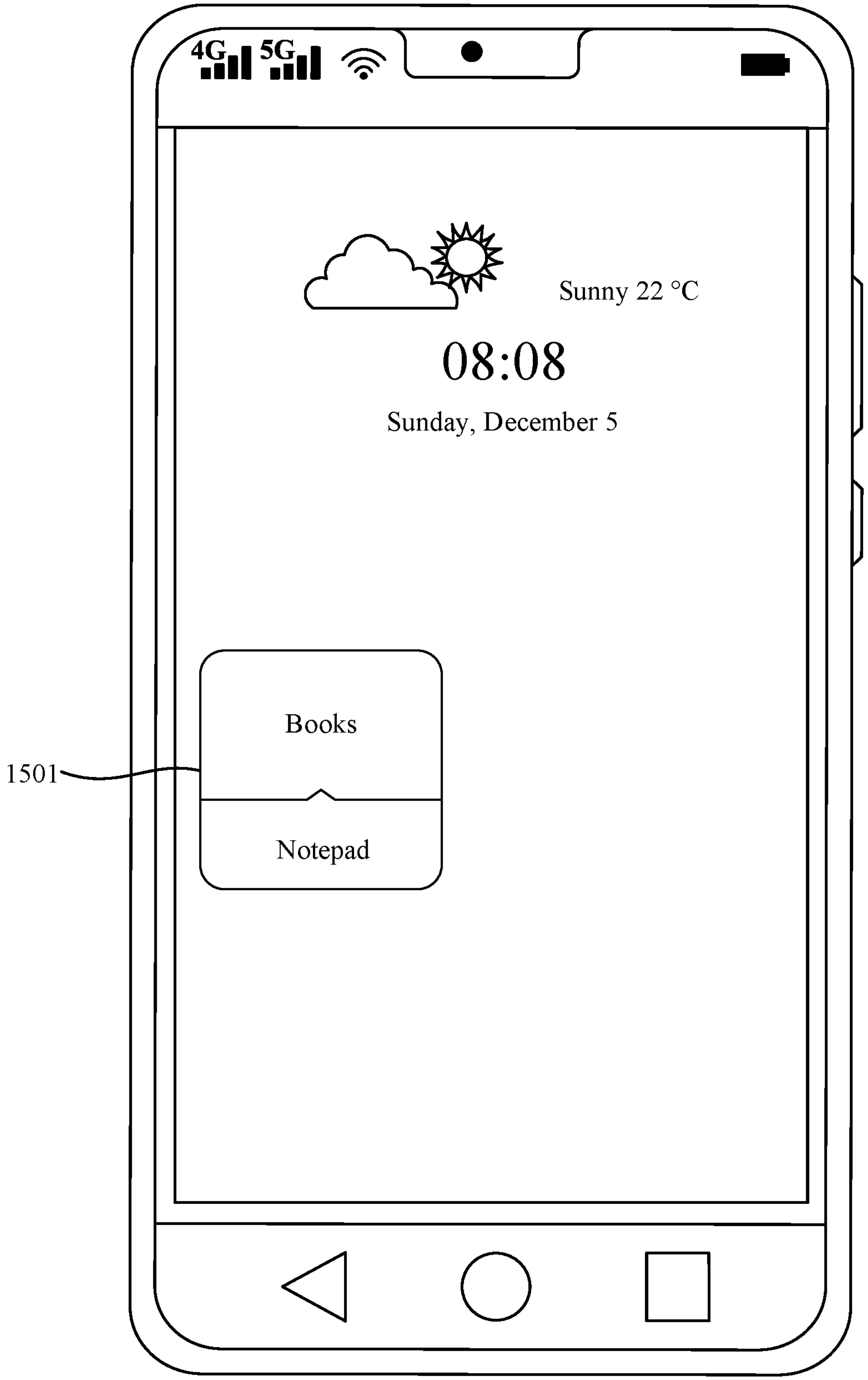
FIG. 15 is still another schematic diagram of a home screen of a mobile phone according to an embodiment of this application.

For example, FIG. 15 is still another schematic diagram of a home screen of a mobile phone according to an embodiment of this application. As shown in FIG. 15, the mobile phone may display a spliced icon 1501 of a books icon 1201 and a notepad icon 1202 on the home screen of the mobile phone. The spliced icon 1501 may include a pattern of the books icon 1201 and a pattern of the notepad icon 1202. After a user taps the spliced icon 1501, the mobile phone may enable, in response to the operation of tapping the spliced icon 1501 by the user, a function corresponding to a function option selected by the user. For example, when the user selects a "reading an ancient poetry dictionary" function option 1401, a "reading a novel" function option 1402, a "text note 1" function option 1403, and a "text note 2" function option 1404, if the user subsequently taps the spliced icon 1501, the mobile phone may enable, in response to the operation of tapping the spliced icon 1501 by the user, functions such as "reading an ancient poetry dictionary", "reading a novel", "text note 1", and "text note 2".

It may be understood that the enabling functions such as the "reading an ancient poetry dictionary", the "reading a novel", the "text note 1", and the "text note 2" herein may mean opening a function page corresponding to each function. For example, enabling the "reading an ancient poetry dictionary" function means opening a page of the ancient poetry dictionary for users to read. In this case, the user may quickly open a plurality of pages at the same time through an operation of tapping the spliced icon 1501 once.

Compared with the functions such as playing music in the foregoing embodiment, the functions provided in this example may be shortcuts or shortcut entries of some pages. In other words, in this application, a first function and a second function may be some functions that can be executed without starting a page, or may be shortcuts, shortcut entries, or the like of some pages. This is not limited herein.

Optionally, in some embodiments, a splicing setting screen of a first icon and a second icon may further include an option of an enabling function corresponding to the first icon and an option of an enabling function corresponding to the second icon. The user may also select the option of the enabling function corresponding to the first icon, use the enabling function corresponding to the first icon as the first function (or the mobile phone considers the enabling function corresponding to the first icon as the first function by default), select the option of the enabling function corresponding to the second icon, and use the enabling function corresponding to the second icon as the second function in the manner described in the foregoing embodiment. When the user taps a subsequently generated spliced icon of the first icon and the second icon, the mobile phone may be triggered to start an application or an FA card corresponding to the first icon and an application or an FA card corresponding to the second icon at the same time. For example, the option of the enabling function corresponding to the first icon displayed on the splicing setting screen may be one icon or another enabling function identifier that has a same display style as the first icon, and the option of the enabling function corresponding to the second icon may be an icon or another enabling function identifier that has a same display style as the second icon. Herein, display manners of the option of the enabling function corresponding to the first icon and the option of the enabling function corresponding to the second icon on the splicing setting screen are not limited.

Optionally, when both the first function and the second function are the shortcuts or shortcut entries of the pages, or are enabling functions of applications or FA cards, a terminal device may open, in response to the operation of tapping the spliced icon by the user, a page corresponding to the first function and a page corresponding to the second function in a split-screen manner, or open an application or an FA card corresponding to the first icon and an application or an FA card corresponding to the second icon in a split-screen manner.

For example, a display of the terminal device may be displayed as a first display area and a second display area in the split-screen manner. The terminal device may display, in the first display area, a screen of the application or the FA card corresponding to the first icon, and display, in the second display area, a screen of the application or the FA card corresponding to the second icon. When the user adjusts split-screen sizes (that is, adjusts sizes of the first display area and the second display area), size of the screen of the application or the FA card corresponding to the first icon and the size of the screen of the application or the FA card corresponding to the second icon may change accordingly.

Optionally, in this implementation, a quantity of functions selected for splicing may be limited. For example, each of the first function and the second function is only one function, and the mobile phone may support screen splitting of the two pages (namely, the page of the first function and the page of the second function).

In some embodiments, after receiving an operation of touching and holding the second icon, the mobile phone may also directly generate, in response to the operation of touching and holding the second icon, the spliced icon of the first icon and the second icon, that is, does not display the splicing setting screen. The mobile phone may open, in response to the operation of tapping the spliced icon by the user, the application or the FA card corresponding to the first icon and the application or the FA card corresponding to the second icon in a screen splitting manner. In this embodiment, the spliced icon of the first icon and the second icon may be considered as a shortcut entry that can trigger starting of the application or the FA card corresponding to the first icon and the application or the FA card corresponding to the second icon at the same time.

The foregoing embodiment describes a manner in which the user selects the first icon and the second icon on a first interface at the same time. Optionally, in some other embodiments, after receiving an operation of tapping a splicing key corresponding to the first icon on a first interface by the user, the terminal device may display a second interface in response to the operation of tapping the splicing key corresponding to the first icon. The second interface may include one or more icons that can be selected by the user. The user may select the second icon from the icons on the second interface.

Figure 16:
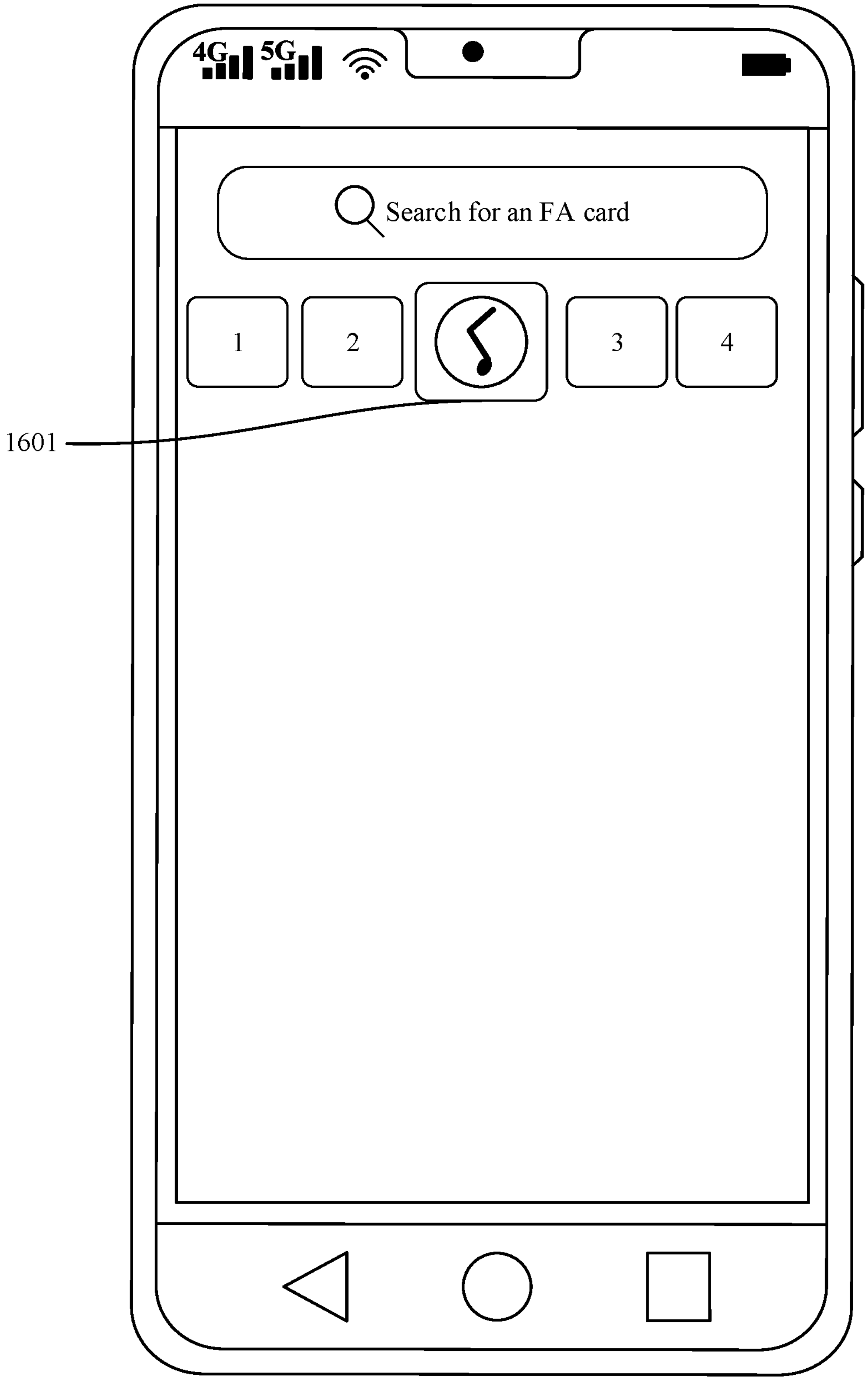
FIG. 16 is a schematic diagram of a second interface according to an embodiment of this application.

Similarly, for example, the first icon is a running icon 301. FIG. 16 is a schematic diagram of a second interface according to an embodiment of this application. As shown in FIG. 16, the second interface may include an icon 1, an icon 2, a music icon 1601, an icon 3, an icon 4, and the like. A user may tap to select any one of the icons as a second icon. For example, the user may tap the music icon 1601. A terminal device may display, in response to the operation of tapping (that is, selecting) the music icon 1601 by the user, a splicing setting screen of a running icon 301 and the music icon 1601.

In an implementation, for the splicing setting screen of the running icon 301 and the music icon 1601, refer to the splicing setting screen of the running icon 301 and the music icon 302 shown in FIG. 5 in the foregoing embodiment. The user may tap a "starting to run" function option on the splicing setting screen. After receiving the operation of tapping the "starting to run" function option by the user, a mobile phone may display, in response to the operation of tapping the "starting to run" function option, a function option corresponding to the music icon 1601 for the user to select. Alternatively, for the splicing setting screen of the running icon 301 and the music icon 1601, refer to the splicing setting screen of the running icon 301 and the music icon 302 shown in FIG. 6 in the foregoing embodiment. A function option corresponding to the music icon 1601 may be directly displayed on the splicing setting screen for the user to select. The user may tap to select a "playing music" function option, or tap to select a "playing a recent list" function option, a "playing hot music charts" function option, a "playing favorite music" function option, and the like, which are not described herein again.

Figure 17:
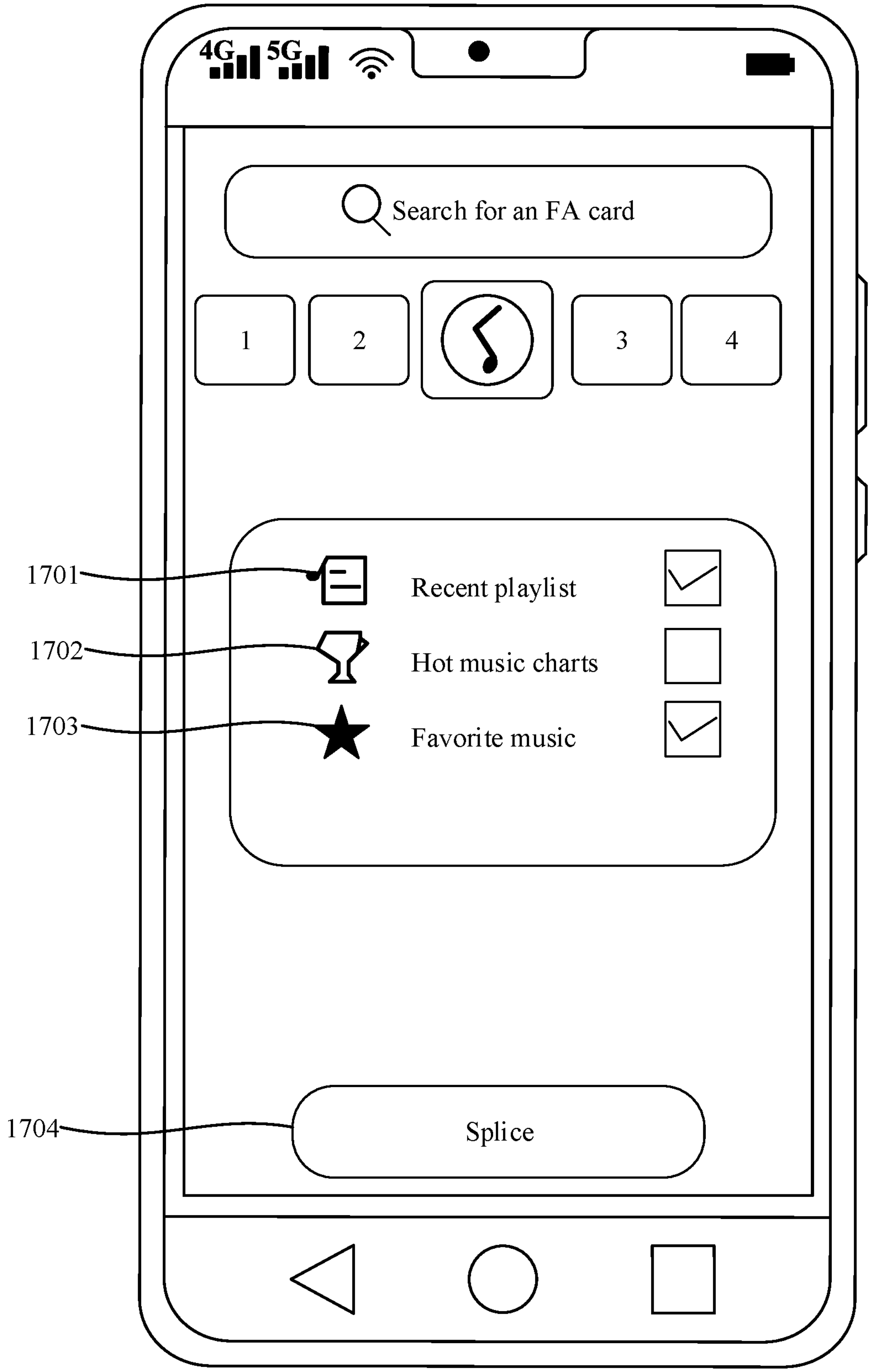
FIG. 17 is another schematic diagram of a second interface according to an embodiment of this application.

In another implementation, after receiving the operation of tapping the "starting to run" function option by the user, the mobile phone may display, in response to the operation of tapping the "starting to run" function option, a function option corresponding to the music icon 1601 on the second interface for the user to select. Alternatively, after receiving the operation of touching and holding the music icon 1601 by the user, the mobile phone may display, in response to the operation of touching and holding the music icon 1601, a function option corresponding to the music icon 1601 on the second interface for the user to select. For example, FIG. 17 is another schematic diagram of a second interface according to an embodiment of this application. As shown in FIG. 17, in response to an operation of tapping a "starting to run" function option, a mobile phone may display a "playing a recent list" function option 1701, a "playing hot music charts" function option 1702, a "playing favorite music" function option 1703, and a splicing key 1704 on the second interface. A user may select one or more function options from the "playing a recent list" function option 1701, the "playing hot music charts" function option 1702, and the "playing favorite music" function option 1703, and tap the splicing key 1704. In response to the operations, the mobile phone may generate a spliced icon based on the "starting to run" and a function option selected by the user.

Figure 18:
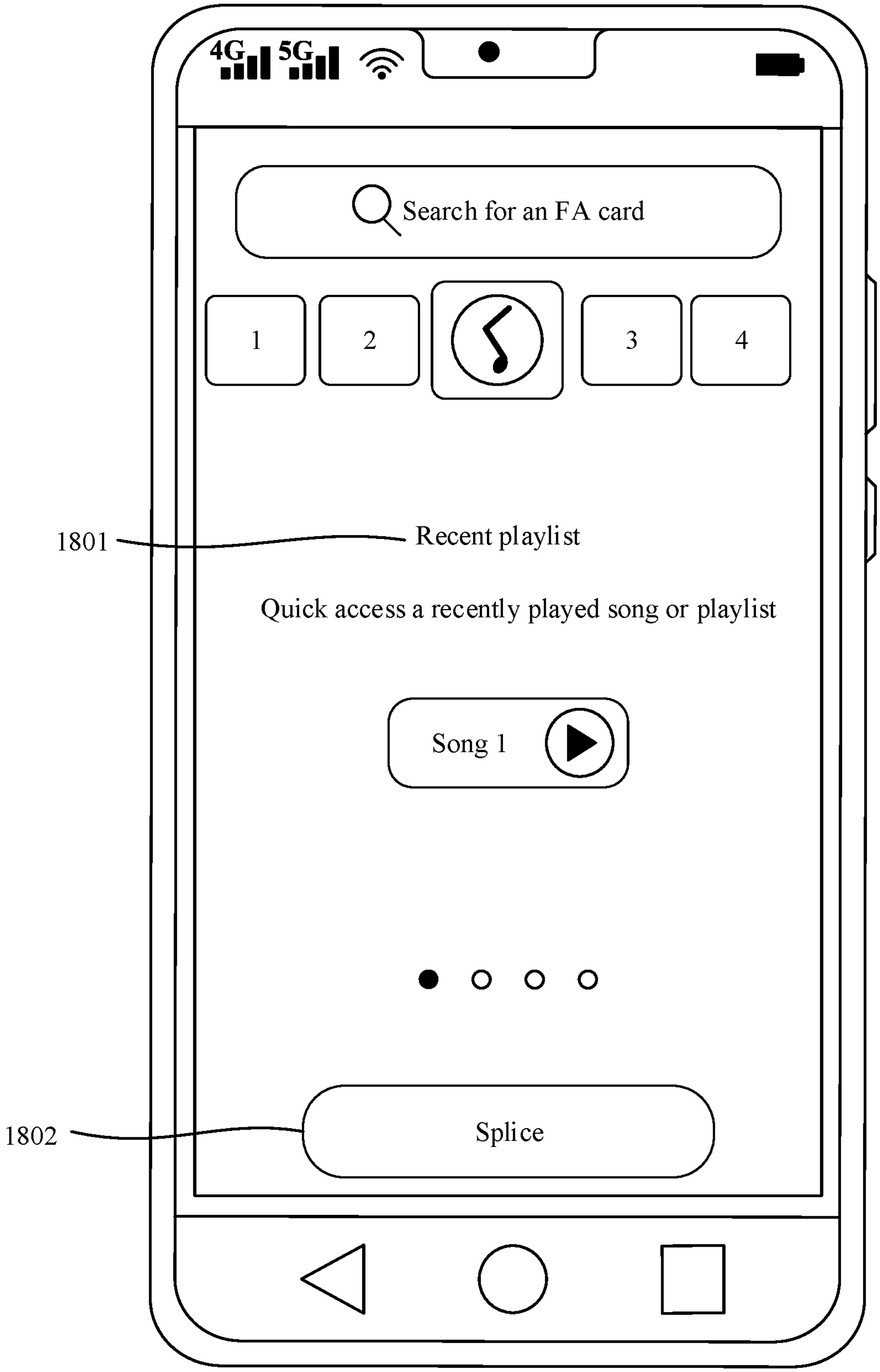
FIG. 18 is still another schematic diagram of a second interface according to an embodiment of this application.

In still another implementation, when the mobile phone displays a function option corresponding to a music icon 1601 on the second interface, the mobile phone may also display only one function option corresponding to the music icon 1601 on each sliding screen in a sliding screen manner. The user may select one function corresponding to the music icon 1601 to implement splicing. For example, FIG. 18 is still another schematic diagram of a second interface according to an embodiment of this application. As shown in FIG. 18, in response to an operation of tapping a "starting to run" function option, a mobile phone may display a "playing a recent list" function option 1801 and a splicing key 1802 in the second interface in a sliding screen manner. A user may directly tap the splicing key 1802. In response to the operation, the mobile phone may generate a spliced icon based on the "starting to run" and the "playing a recent list".

Figure 19:
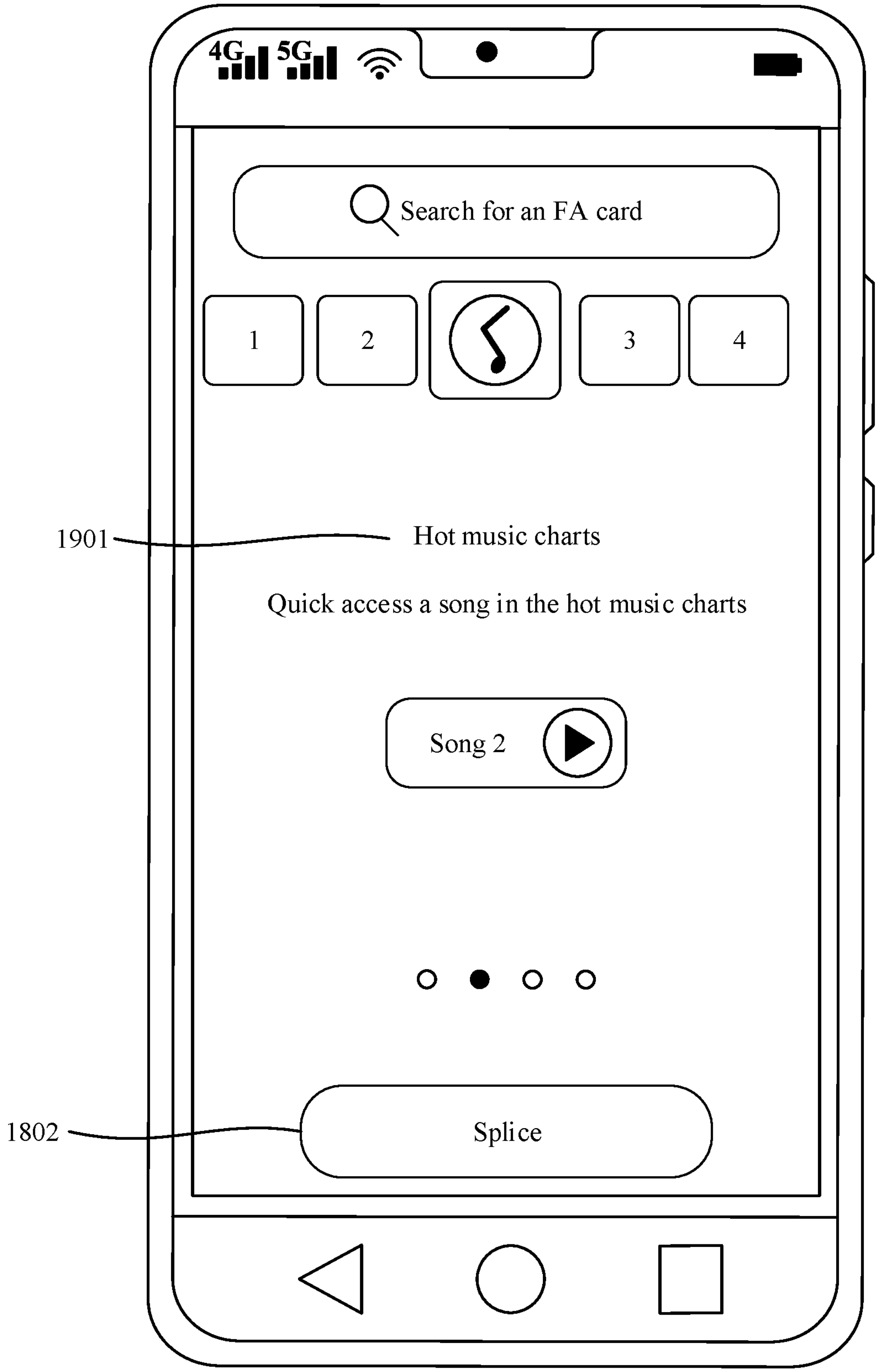
FIG. 19 is still another schematic diagram of a second interface according to an embodiment of this application.

When the user wants to select another function corresponding to a music icon 1601, the user may slide left or right on the screen. The mobile phone may switch to a previous or next sliding screen in response to the operation of sliding the screen by the user, and display an option of the another function corresponding to the music icon 1601. For example, FIG. 19 is still another schematic diagram of a second interface according to an embodiment of this application. As shown in FIG. 19, a mobile phone may display a next sliding screen (that is, update the second interface) in response to an operation of sliding a screen by a user. The next sliding screen (that is, the updated second interface) may include an option of another function corresponding to a music icon 1601, for example, a "playing hot music charts" function option 1901 and a splicing key 1802. A user may directly tap the splicing key 1802. In response to the operation, the mobile phone may generate a spliced icon based on "starting to run" and "playing hot music charts".

Optionally, the second interface may be referred to as a card center screen or an application center screen. The second interface may be provided by a system capability. The system capability may be referred to as a card center or an application center. The card center or the application center may include all application icons of applications and card icons of cards installed in a system, or include an icon that supports splicing in all application icons of applications and card icons of cards installed in a system, for example, an icon that can be spliced with a first icon.

Optionally, in some possible implementations, one or more icons and/or function options that are displayed on the second interface and that can be selected by the user may be presented in a form of a list. For example, the second interface may include an icon list, and the icon list may include one or more icons that can be selected by the user. For another example, the second interface may include a function option list corresponding to one or more applications. This is not limited herein.

Optionally, when the splicing setting screen and/or the second interface displays an option of a function supported by an application or the FA card corresponding to the first icon or the second icon or both, only a function option that supports linkage may be displayed. For example, there may be a plurality of function options corresponding to the second icon, but only the function option that supports linkage in the plurality of function options may be displayed on the splicing setting screen and/or the second interface.

Optionally, when the splicing setting screen and/or the second interface displays an option of a function supported by an application or the FA card corresponding to the first icon or the second icon or both, all function options may be displayed, but a function option that does not support linkage does not support selection. For example, there may be a plurality of function options corresponding to the second icon, and the plurality of function options may be displayed on the splicing setting screen and/or the second interface. However, the function option that does not support linkage does not support selection, and the user cannot select the function option that does not support linkage as a second function.

In some embodiments, the splicing setting screen and/or the second interface may further include a splicing preview key. After selecting a first function and a second function, the user may further tap the splicing preview key to preview the spliced icon. The operation of tapping the splicing preview key may be referred to as an operation of previewing the spliced icon of the first icon and the second icon.

Figure 20:
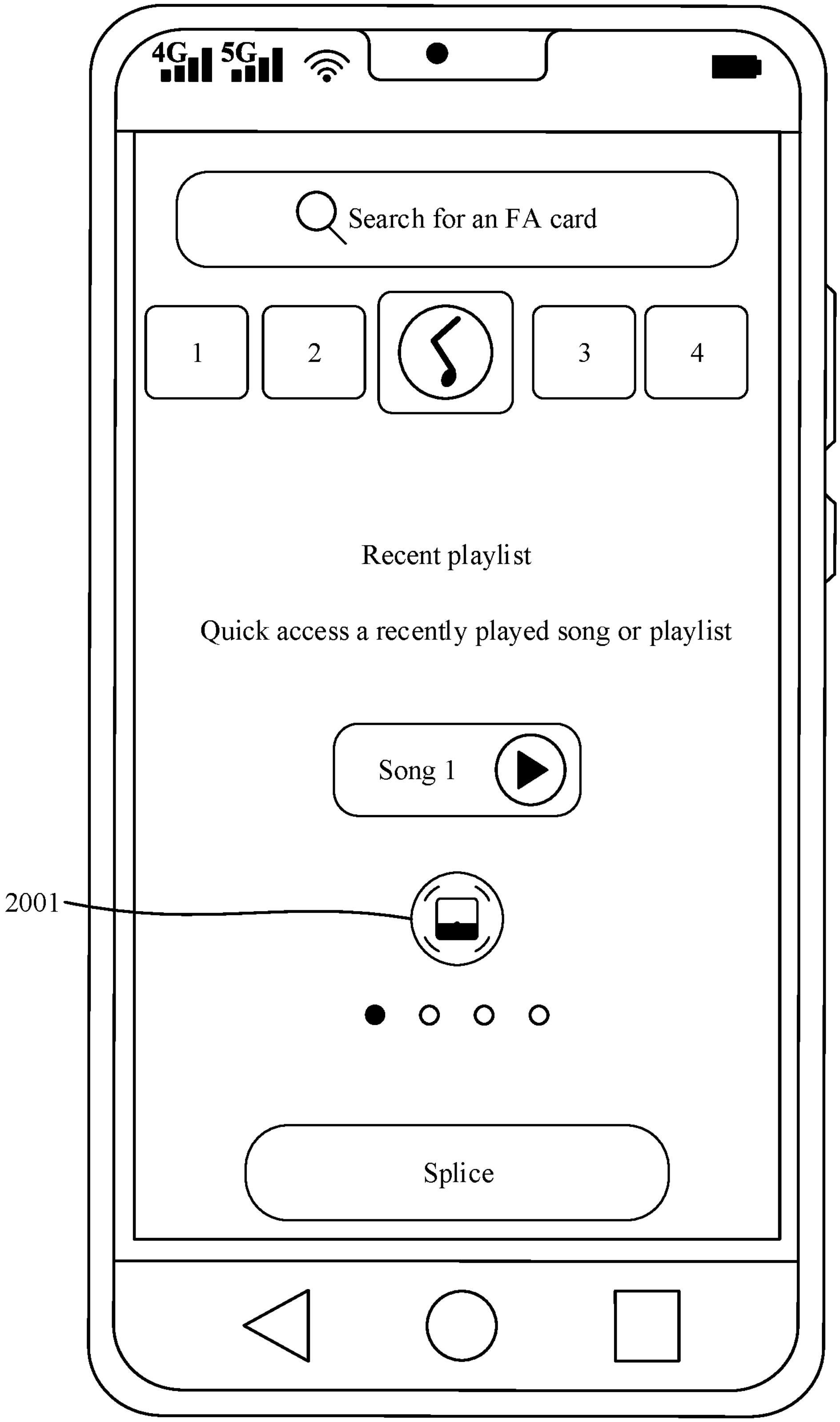
FIG. 20 is a schematic diagram of displaying a splicing preview key by a mobile phone according to an embodiment of this application.

For example, the second interface includes the splicing preview key (a manner in which the splicing setting screen includes the splicing preview key is similar). FIG. 20 is a schematic diagram of displaying a splicing preview key by a mobile phone according to an embodiment of this application. As shown in FIG. 20, a second interface may further include a splicing preview key 2001. When a user wants to preview a spliced icon, the user may tap the splicing preview key 2001. The mobile phone may display, in response to the operation of tapping the splicing preview key 2001 by the user, a preview screen of the spliced icon.

Figure 21:
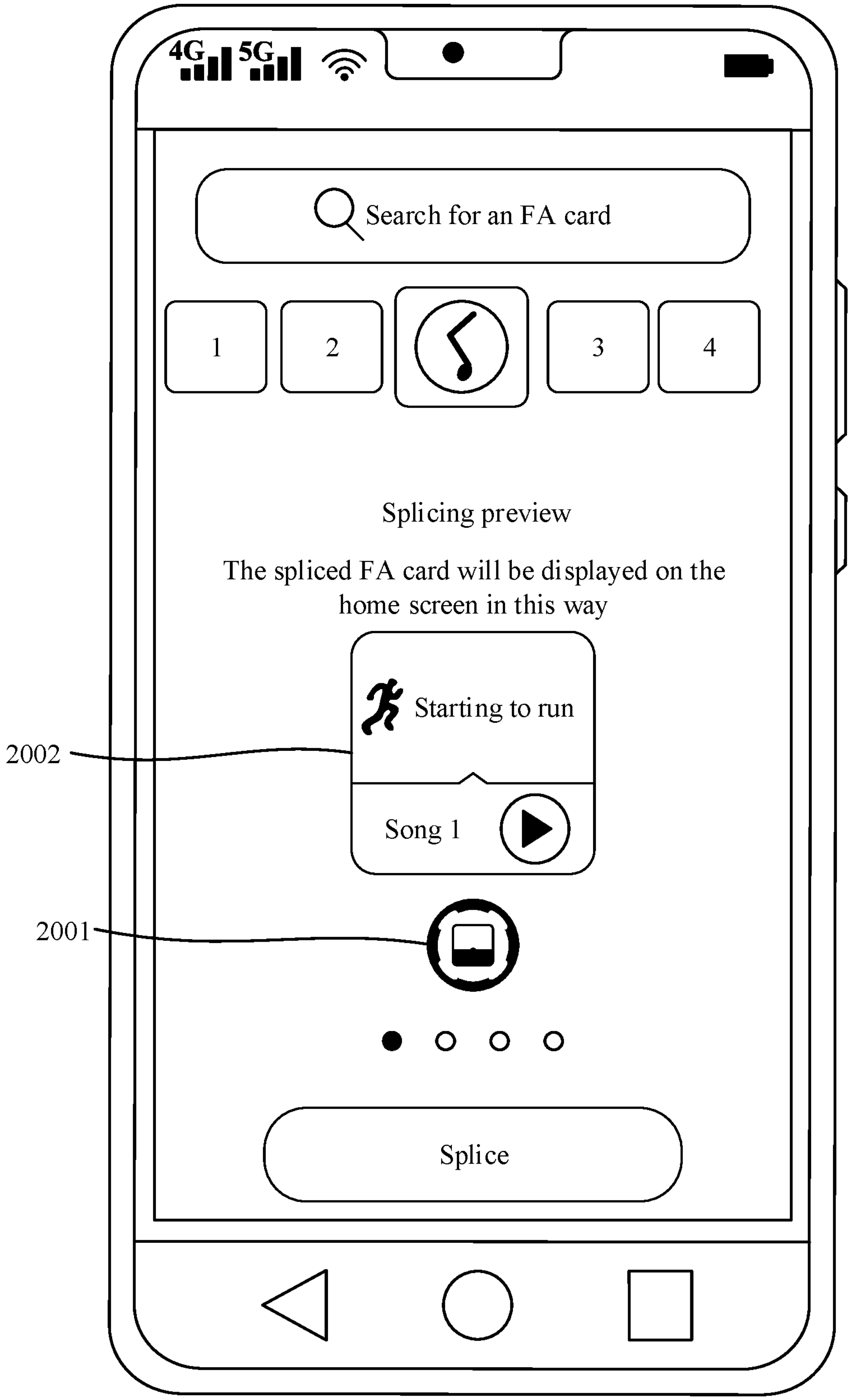
FIG. 21 is a schematic diagram of a preview screen of a spliced icon according to an embodiment of this application.

For example, FIG. 21 is a schematic diagram of a preview screen of a spliced icon according to an embodiment of this application. As shown in FIG. 21, the preview screen of the spliced icon may include a previewed spliced icon 2002 and a splicing preview key 2001. Compared with FIG. 20, FIG. 21 shows a change in display effect of the splicing preview key 2001. The change may be a change in one or more dimensions such as a shape, a color, and an animation, and is used to prompt a user that the spliced icon is currently previewed.

Optionally, the preview screen of the spliced icon may further include a text prompt used to prompt the user that the spliced icon is currently previewed. For example, a text prompt may be "A spliced FA card will be displayed on the home screen in this way".

An embodiment of this application further provides an icon splicing method, which may be applied to a terminal device. In the method, the terminal device may include at least one icon, and the icon may be an application icon or an FA card icon. The terminal device may support one or more system capabilities. A user may select one first icon from an icon included in the terminal device, select at least one system capability from the system capabilities supported by the terminal device to splice with the first icon, to generate a spliced icon. The generated spliced icon may support linkage between the application or the FA card corresponding to the first icon and the system capability. The spliced icon responds more intelligently to a user interaction action, and user interaction efficiency can be effectively improved.

Figure 22:
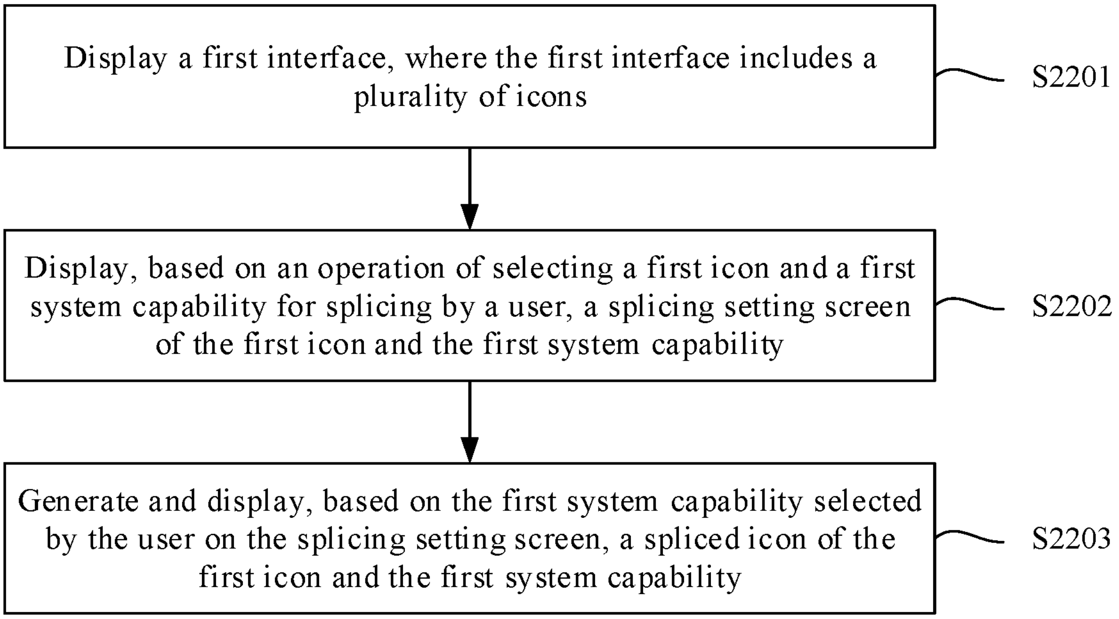
FIG. 22 is another schematic flowchart of an icon splicing method according to an embodiment of this application.

For example, FIG. 22 is another schematic flowchart of an icon splicing method according to an embodiment of this application. In some embodiments, a procedure shown in FIG. 22 may be performed by a terminal device (for example, a mobile phone). As shown in FIG. 22, the icon splicing method may include the following steps.

S2201: Display a first interface, where the first interface includes a plurality of icons.

For example, the terminal device may be the mobile phone, and the first interface may be a home screen of the mobile phone.

Figure 23:
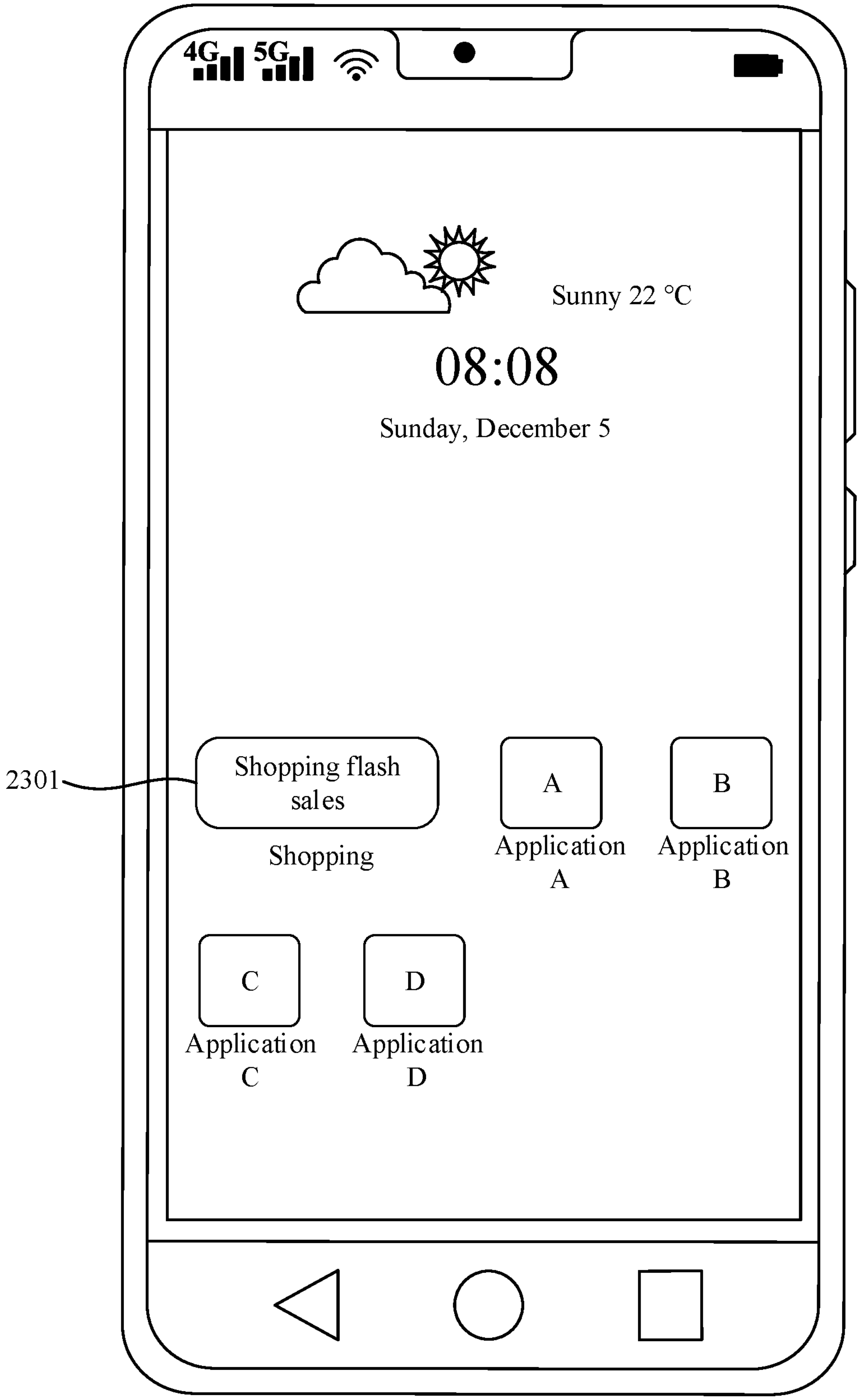
FIG. 23 is still another schematic diagram of a home screen of a mobile phone according to an embodiment of this application.

For example, FIG. 23 is still another schematic diagram of a home screen of a mobile phone according to an embodiment of this application. As shown in FIG. 23, in a possible scenario, the home screen of the mobile phone may include a plurality of icons such as a shopping icon 2301, and icons (not numbered) of an application A to an application D.

S2202: Display, in response to an operation of selecting a first icon and a first system capability for splicing by a user, a splicing setting screen of the first icon and the first system capability.

The first icon is one of the plurality of icons in S2201.

The icons included in the first interface may include an application icon and/or a card icon. The first icon may be an application icon, or may be an FA card icon.

For example, the first icon may be any one of a plurality of icons displayed on the home screen of the mobile phone shown in FIG. 23, such as the shopping icon 2301, and the icons of the application A to the application D.

In some embodiments, the step of displaying, in response to an operation of selecting a first icon and a first system capability for splicing by a user, a splicing setting screen of the first icon and the first system capability may include: receiving an operation of selecting the first icon; displaying, in response to the operation of selecting the first icon, an automatic trigger key corresponding to the first icon; receiving an operation of tapping the automatic trigger key corresponding to the first icon; and displaying, in response to the operation of tapping the automatic trigger key corresponding to the first icon, the splicing setting screen of the first icon and the system capability.

In this application, the operation of selecting the first icon and the operation of tapping the automatic trigger key corresponding to the first icon may also be referred to as a first operation.

The splicing setting screen may include one or more system capability options (or referred to as identifier information) supported by the terminal device (for example, the mobile phone).

Figure 24:
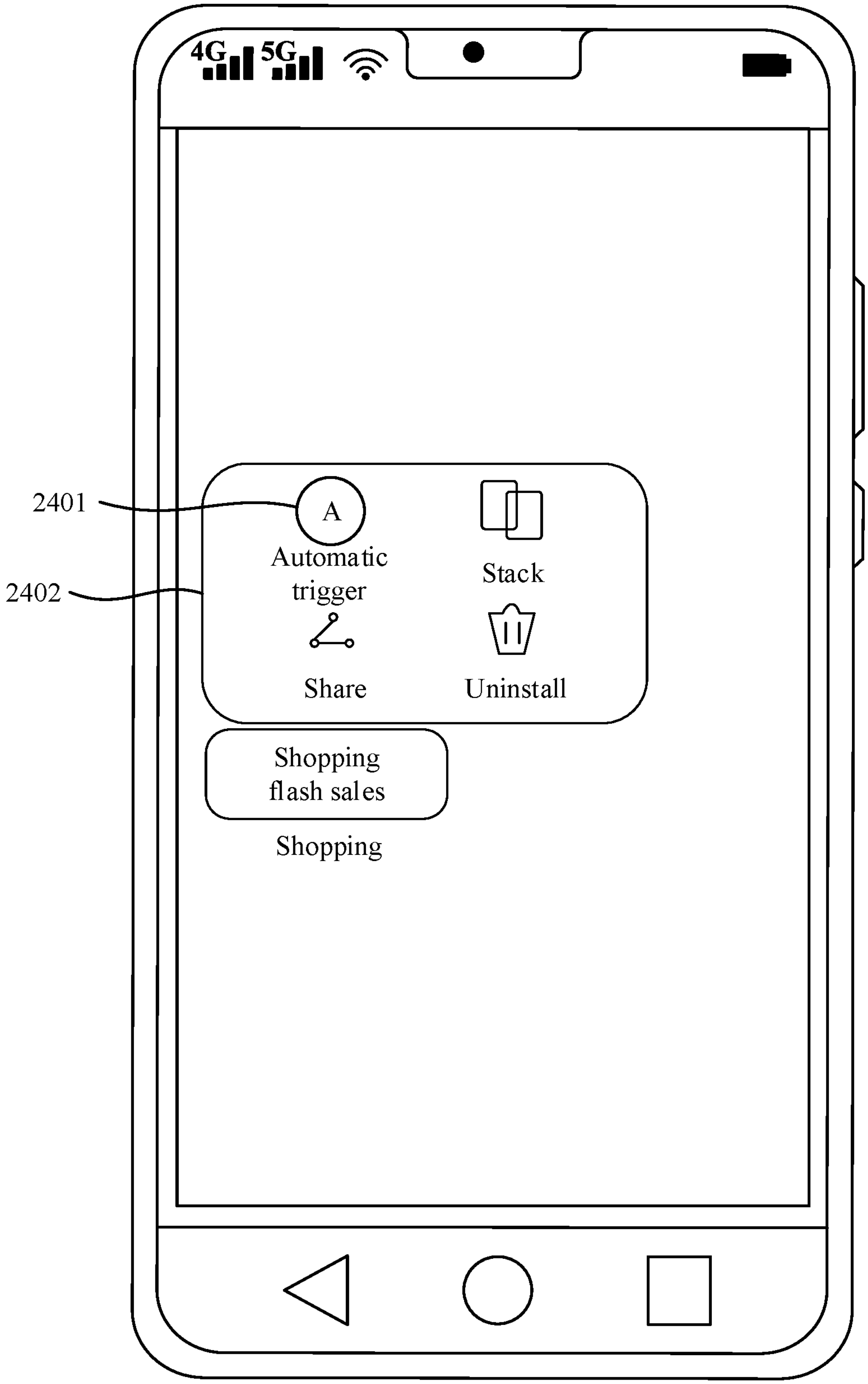
FIG. 24 is a schematic diagram of displaying an automatic trigger key corresponding to a shopping icon 2301 by a mobile phone according to an embodiment of this application.

For example, the first icon is the shopping icon 2301. FIG. 24 is a schematic diagram of displaying an automatic trigger key corresponding to a shopping icon 2301 by a mobile phone according to an embodiment of this application. As shown in FIG. 24, in a possible scenario, after receiving an operation of selecting (for example, touching and holding, or double-tapping) the shopping icon 2301, the mobile phone may display, in response to the operation of selecting the shopping icon 2301, a splicing menu 2402 corresponding to the shopping icon 2301. The splicing menu 2402 may include the automatic trigger key 2401 corresponding to the shopping icon 2301.

Optionally, the splicing menu 2402 may further include other keys such as stack, share, and uninstall, and these other keys may separately provide other functions for the user. For example, when the user taps the stack key, a function of stacking the shopping icon 2301 with another icon may be used. When the user taps the share key, a function of sharing an application or an FA card corresponding to the shopping icon 2301 may be used. When the user taps the uninstall key, a function of uninstalling the application or the FA card corresponding to the running icon 301 may be used. The other keys included in the splicing menu 2402 and the functions corresponding to the other keys are not limited herein.

In some other possible scenarios, after receiving an operation of selecting the shopping icon 2301, the mobile phone may display, in response to the operation of selecting the shopping icon 2301, only the automatic trigger key 2401 corresponding to the shopping icon 2301. In other words, the mobile phone may display the automatic trigger key 2401 without using the splicing menu 2402, which is not limited herein.

Optionally, for a manner in which the mobile phone displays the automatic trigger key 2401 corresponding to the shopping icon 2301, refer to the manner in which the mobile phone displays the splicing key 401 corresponding to the running icon 301 in the foregoing embodiment. Details are not described again.

After the automatic trigger key 2401 corresponding to the shopping icon 2301 shown in FIG. 24 is displayed, the user may tap the automatic trigger key 2401 corresponding to the shopping icon 2301. The mobile phone may display, in response to the operation of tapping the automatic trigger key 2401 corresponding to the shopping icon 2301, a splicing setting screen of the shopping icon 2301 and the system capability.

Figure 25:
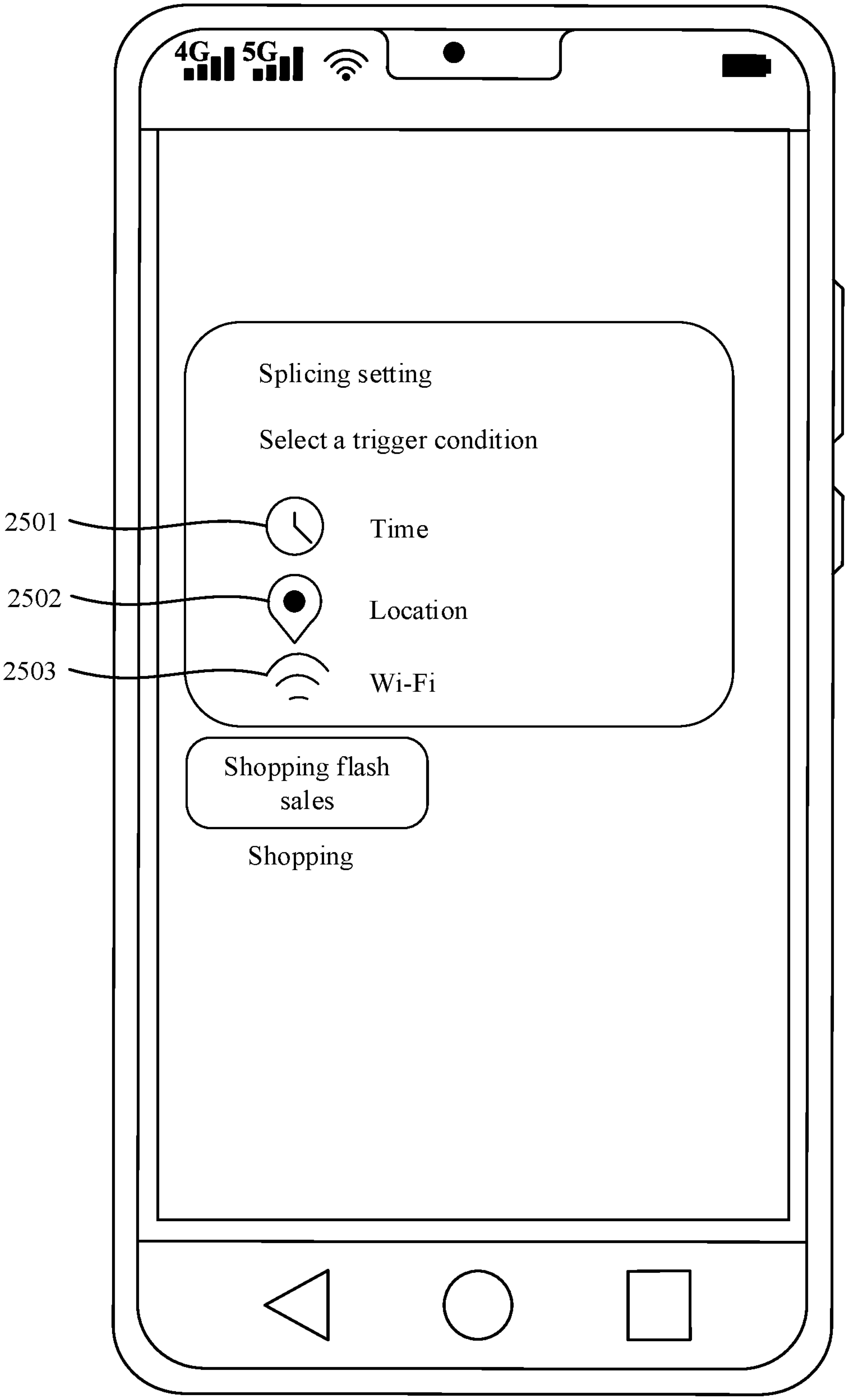
FIG. 25 is a schematic diagram of a splicing setting screen of a shopping icon 2301 and a system capability according to an embodiment of this application.

For example, FIG. 25 is a schematic diagram of a splicing setting screen of a shopping icon 2301 and a system capability according to an embodiment of this application. As shown in FIG. 25, the splicing setting screen may include ability options of system capabilities such as a "time" ability option 2501, a "location" ability option 2502, and a Wi-Fi ability option 2503. A type and a quantity of the system capability are not limited herein.

S2203: Generate and display, based on the first system capability selected by the user on the splicing setting screen, a spliced icon of the first icon and the first system capability.

The step of generating and displaying a spliced icon of the first icon and the first system capability based on the first system capability selected by the user on the splicing setting screen may include: receiving an operation of selecting the first system capability option by the user (which may be referred to as a second operation); and generating and displaying, in response to the operation of selecting the first system capability option, the spliced icon of the first icon and the first system capability based on the first system capability.

The splicing setting screen shown in FIG. 25 is used as an example. The first system capability may be "time". For example, the user may tap the "time" ability option 2501 on the splicing setting screen shown in FIG. 25. The mobile phone may display, in response to the operation of tapping the "time" ability option 2501, a setting menu corresponding to the "time".

Figure 26:
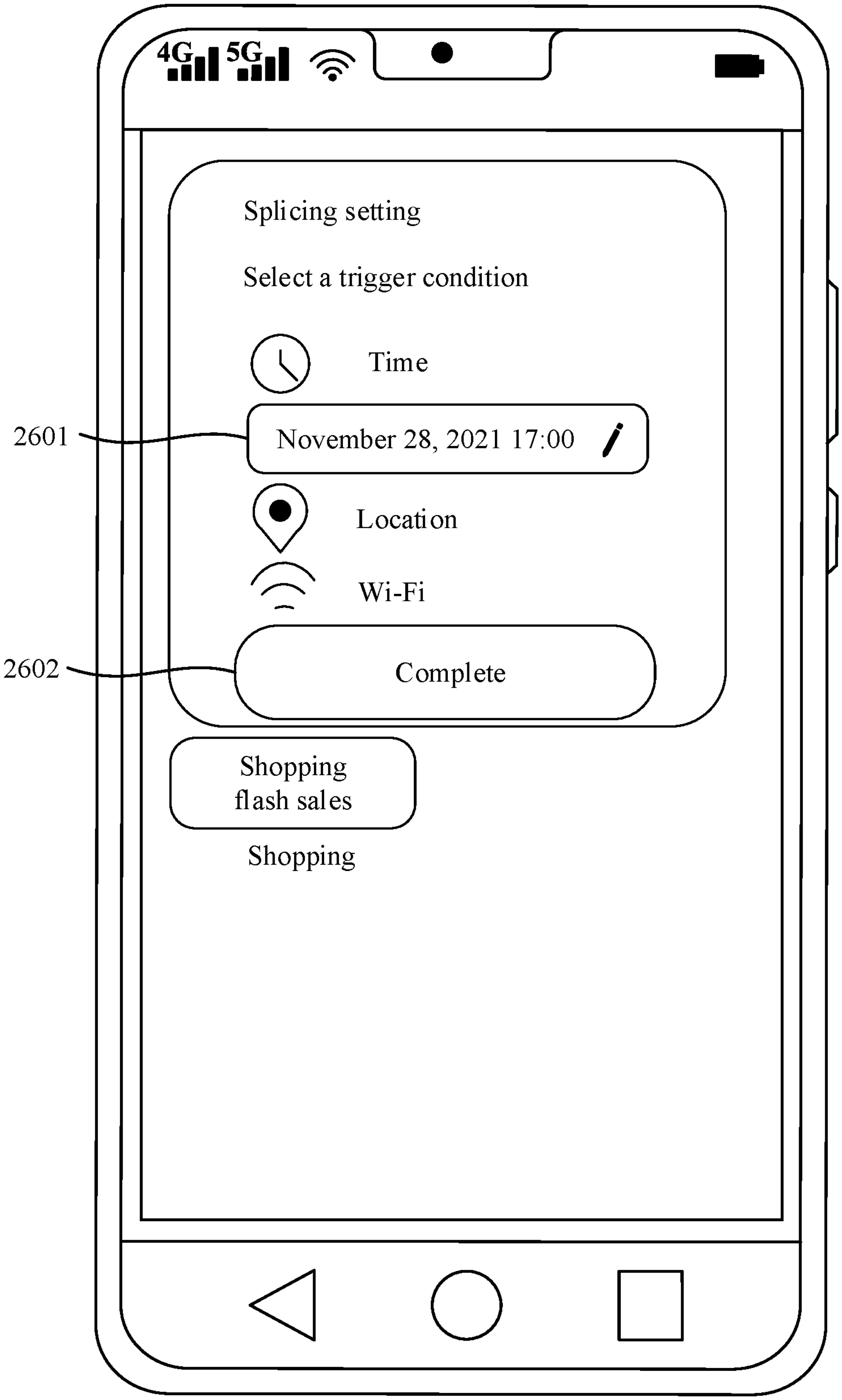
FIG. 26 is still another schematic diagram of a splicing setting screen according to an embodiment of this application.

For example, FIG. 26 is still another schematic diagram of a splicing setting screen according to an embodiment of this application. As shown in FIG. 26, the mobile phone may update the splicing setting screen. An updated splicing setting screen may include the setting menu 2601 corresponding to the "time" and a complete key 2602. The user may set time in the setting menu 2601, and tap the complete key 2602. The mobile phone may generate and display, in response to the operations of setting the time in the setting menu 2601 and tapping the complete key 2602 by the user, a spliced icon of the shopping icon 2301 and the "time" based on the "time".

Optionally, the mobile phone may display the spliced icon of the first icon and the first system capability on the first interface. The mobile phone may start, in response to detecting a trigger of the first system capability, an application or an FA card corresponding to the first icon.

Figure 27:
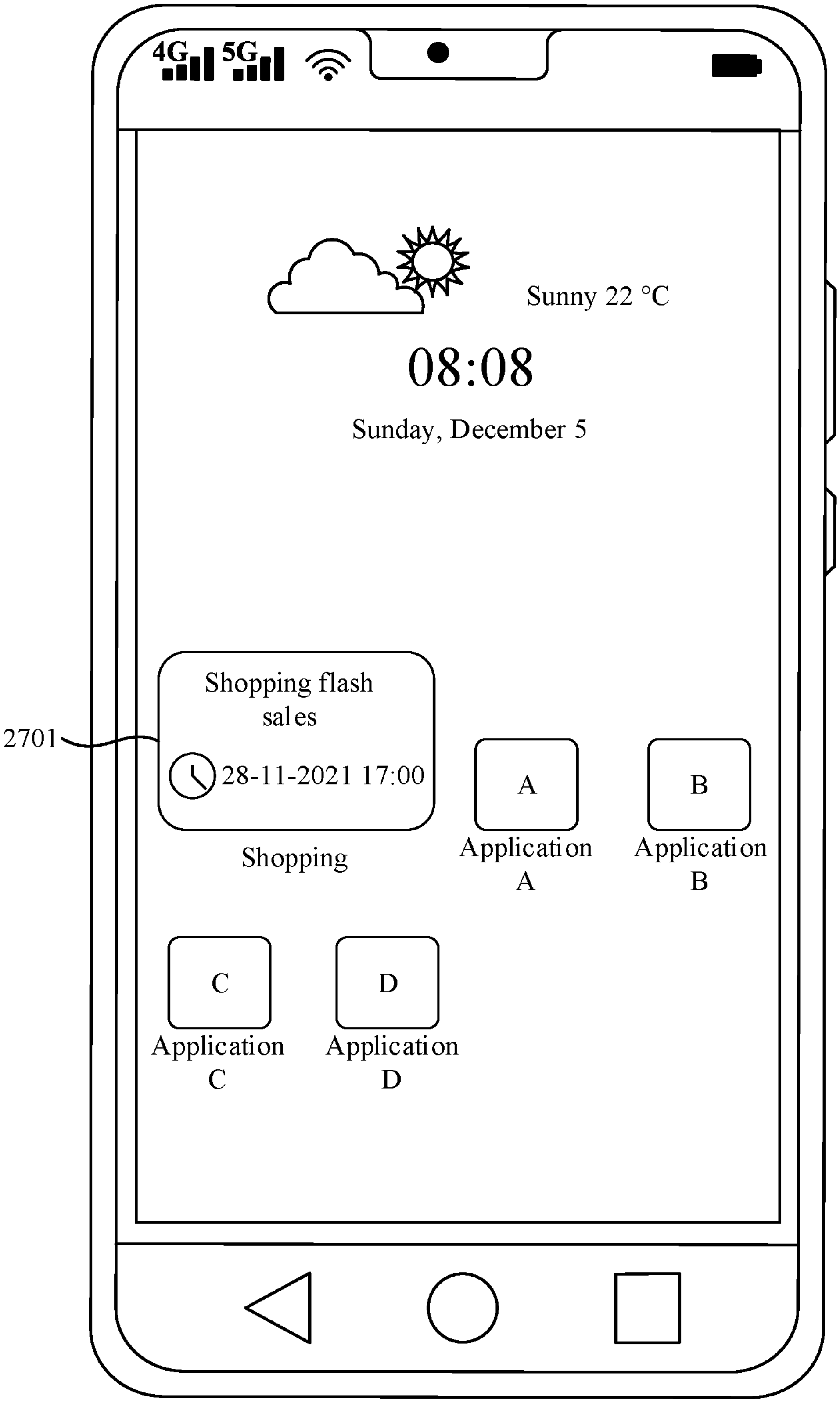
FIG. 27 is still another schematic diagram of a home screen of a mobile phone according to an embodiment of this application.

For example, FIG. 27 is still another schematic diagram of a home screen of a mobile phone according to an embodiment of this application. As shown in FIG. 27, the mobile phone may display the spliced icon 2701 of the shopping icon 2301 and the "time" on the home screen of the mobile phone. The spliced icon 2701 may include a pattern of the shopping icon 2301 and the time set by the user in the setting menu 2601. For example, if the time set by the user in the setting menu 2601 is "Nov. 28, 2021 17:00", time included in the spliced icon 2701 may be "28-11-2021 17:00". When system time of the mobile phone reaches 17:00 on Nov. 28, 2021, the mobile phone may detect a trigger of the first system capability, and start a shopping application or an FA card corresponding to the shopping icon 2301.

The "28-11-2021 17:00" may be further considered as identifier information of the first system capability. In this embodiment, for a layout relationship between the first icon and identifier information of the system capability in the spliced icon, refer to the layout relationship between the first icon and the second icon in the foregoing embodiment. Alternatively, the identifier information of the system capability may be displayed above the first icon. This is not limited.

Optionally, in some other examples, the first system capability may alternatively include a plurality of system capabilities. For example, the user may select "time" and "location", and set target time and a target location. That mobile phone starts, in response to detecting a trigger of the first system capability, an application or an FA card corresponding to the first icon may include: When detecting that system time reaches the target time and/or a current location is the target location, the mobile phone starts the application or the FA card corresponding to the first icon.

Optionally, in some other embodiments of this application, the first icon and/or the second icon in the foregoing embodiments may alternatively be a spliced icon that completes splicing (for example, a spliced icon of a third icon and a fourth icon). In other words, in this embodiment of this application, after two icons are spliced to obtain a spliced icon, the spliced icon may be further spliced with a new icon or a system capability; or after an icon is spliced with a system capability to obtain a spliced icon, the spliced icon may be further spliced with a new icon or system capability.

For example, in a possible example, the first icon may alternatively be a spliced icon 701 obtained by splicing the running icon 301 (the third icon) and a music icon (the fourth icon). The user may splice the spliced icon 701 with an alarm icon in a manner similar to that in the foregoing embodiment, and select a function of the alarm as providing a reminder at target time. After the user taps a spliced icon obtained by splicing the spliced icon 701 with the alarm icon, the mobile phone may start to record running information, start to play music, and may remind the user to end running after the target time set by the alarm is reached.

For another example, in another possible example, the mobile phone may be a mobile phone with a foldable display, and the first icon may alternatively be a spliced icon obtained by splicing a passenger code icon and a health code icon. The user may splice the spliced icon obtained by splicing the passenger code icon and the health code icon with a system capability "display folding" in a manner similar to that in the foregoing embodiment. When the mobile phone detects that the foldable display is opened, passenger code and health code can be opened at the same time. In a scenario in which the user uses a vehicle like a subway or a bus, it may be more convenient for the user to display the health code and scan bus code to use the vehicle.

Optionally, in some embodiments of this application, the user may further split the spliced icon. For example, the user may press and hold the spliced icon, and the terminal device may receive the operation of pressing and holding the spliced icon by the user. The terminal device may display one split key in response to the operation of touching and holding the spliced icon by the user. The user may tap the split key, and the terminal device may split the spliced icon in response to the operation of tapping the split key by the user, for example, may delete or no longer display the spliced icon. The operation of touching and holding the spliced icon and the operation of tapping the split key may be referred to as an operation of splitting the spliced icon.

Optionally, in this embodiment of this application, the terminal device may include a trigger, and the trigger may be configured to implement a linkage function of the spliced icon.

Figure 28:
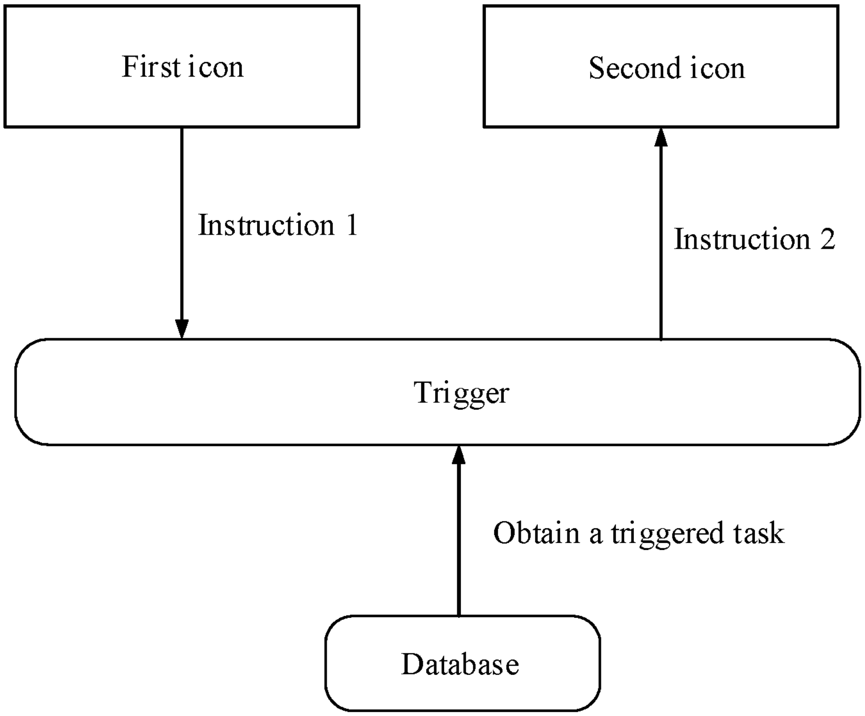
FIG. 28 is a schematic diagram of a linkage principle of a spliced icon according to an embodiment of this application.

For example, FIG. 28 is a schematic diagram of a linkage principle of a spliced icon according to an embodiment of this application. As shown in FIG. 28, for a spliced icon spliced by a first icon with a second icon, when detecting an operation of tapping the spliced icon, a mobile phone may start an application or an FA card corresponding to the first icon. The application or the FA card corresponding to the first icon may send one instruction (for example, an instruction 1) to a trigger. After receiving the instruction, the trigger may query a database based on the instruction to obtain a triggered task. The triggered task stored in the database may be starting an application or an FA card corresponding to the second icon at the same time when the application or the FA card corresponding to the first icon is started. The instruction may include identifier information of the application or the FA card corresponding to the first icon, for example, an application package name. After obtaining the triggered task, the trigger may execute the triggered task, that is, may start the application or the FA card corresponding to the second icon. For example, the trigger may send an instruction (for example, an instruction 2) to the application or the FA card corresponding to the second icon, to instruct the application or the FA card corresponding to the second icon to start.

It should be understood that the foregoing embodiments are merely examples for describing the icon splicing methods provided in embodiments of this application. In some other possible implementations, some execution steps may be deleted or added in the foregoing embodiments, or a sequence of some steps in the foregoing embodiments may be adjusted. This is not limited in this application.

Corresponding to the icon splicing methods provided in the foregoing embodiments, an embodiment of this application further provides an icon splicing apparatus. The apparatus may be applied to a terminal device, so that the terminal device performs the icon splicing methods provided in the foregoing method embodiments. A function of the apparatus may be implemented by hardware, or may be implemented by hardware by executing corresponding software. The hardware or software includes one or more modules or units corresponding to the steps in the icon splicing methods provided in the foregoing method embodiments.

Figure 29:
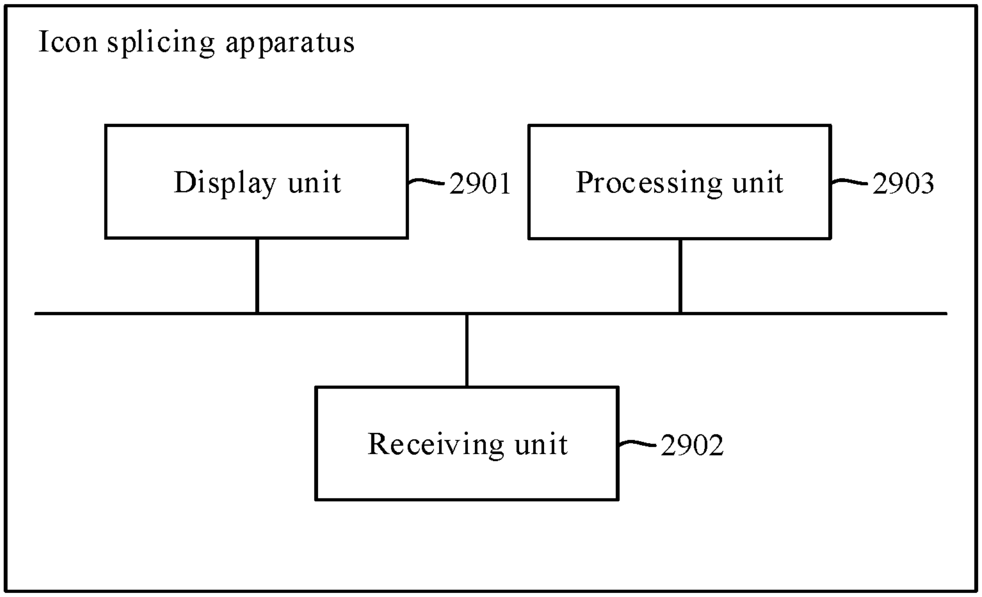
FIG. 29 is a schematic diagram of a structure of an icon splicing apparatus according to an embodiment of this application.

For example, FIG. 29 is a schematic diagram of a structure of an icon splicing apparatus according to an embodiment of this application. As shown in FIG. 29, the icon splicing apparatus may include a display unit 2901, a receiving unit 2902, a processing unit 2903, and the like The display unit 2901 is configured to display a first icon. The receiving unit 2902 is configured to receive a first operation, where the first operation is an operation of triggering splicing of the first icon. The processing unit 2903 is configured to display, in response to the first operation, a second icon by using the display unit 2901. The receiving unit 2902 is further configured to receive a second operation, where the second operation is an operation of selecting the second icon and the first icon for splicing. The processing unit 2903 is further configured to display, in response to the second operation, options of a plurality of functions corresponding to the second icon by using the display unit 2901. The receiving unit 2902 is further configured to receive an operation of selecting an option of a second function. The second function includes one or more of the plurality of functions corresponding to the second icon. The processing unit 2903 is further configured to display, in response to the operation of selecting the option of the second function, a spliced icon of the first icon and the second icon by using the display unit 2901. The spliced icon has a function of supporting linkage between a first function and the second function. The first function includes one or more of a plurality of functions corresponding to the first icon.

In a possible implementation, the processing unit 2903 is further configured to display, in response to the second operation, options of the plurality of functions corresponding to the first icon by using the display unit 2901. The receiving unit 2902 is further configured to receive an operation of selecting an option of the first function.

The processing unit 2903 is configured to display, in response to the operation of selecting the option of the first function and the operation of selecting the option of the second function, the spliced icon of the first icon and the second icon by using the display unit 2901.

In another possible implementation, the first function is a default splicing function corresponding to the first icon.

Optionally, the receiving unit 2902 is further configured to receive an operation of tapping the spliced icon; and the processing unit 2903 is further configured to enable the first function and the second function in response to the operation of tapping the spliced icon.

In a possible implementation, the processing unit 2903 is configured to: obtain a current screen form of the terminal device; determine a layout of the first icon and the second icon in the spliced icon based on the current screen form; and display the spliced icon of the first icon and the second icon by using the display unit 2901 based on the layout of the first icon and the second icon in the spliced icon.

Optionally, the processing unit 2903 is configured to: when the current screen form is a landscape state, determine that the layout of the first icon and the second icon in the spliced icon is a left-right layout; or when the current screen form is a portrait state, determine that the layout of the first icon and the second icon in the spliced icon is a top-down layout.

In a possible implementation, an area occupied by the first icon in the spliced icon is greater than an area occupied by the second icon in the spliced icon.

Optionally, the display unit 2901 is configured to display a first interface, where the first interface includes the first icon.

The receiving unit 2902 is configured to receive an operation of selecting the first icon. The processing unit 2903 is further configured to display, in response to the operation of selecting the first icon, a splicing key corresponding to the first icon by using the display unit 2901. The receiving unit 2902 is further configured to receive an operation of tapping the splicing key corresponding to the first icon. The operation of selecting the first icon and the operation of tapping the splicing key corresponding to the first icon are the first operation.

In a possible implementation, the processing unit 2903 is configured to display the first interface again in response to the first operation by using the display unit 2901, where the first interface further includes the second icon.

Optionally, the display unit 2901 is further configured to: when the first interface is displayed again, highlighting the first icon in the first interface, or displaying a first identifier related to the first icon.

In another possible implementation, the processing unit 2903 is configured to display a second interface in response to the first operation by using the display unit 2901, where the second interface includes all icons of the terminal device, or an icon that supports splicing in all the icons of the terminal device.

In a possible implementation, the receiving unit 2902 is further configured to receive an operation of previewing the spliced icon of the first icon and the second icon; and the processing unit 2903 is further configured to display, by using the display unit 2901, a preview screen in response to the operation of previewing the spliced icon of the first icon and the second icon. The preview screen includes the spliced icon of the first icon and the second icon.

In a possible implementation, the first icon is a spliced icon of a third icon and a fourth icon.

In a possible implementation, the receiving unit 2902 is further configured to receive an operation of splitting the spliced icon; and the processing unit 2903 is further configured to delete the spliced icon in response to the operation of splitting the spliced icon.

Figure 30:
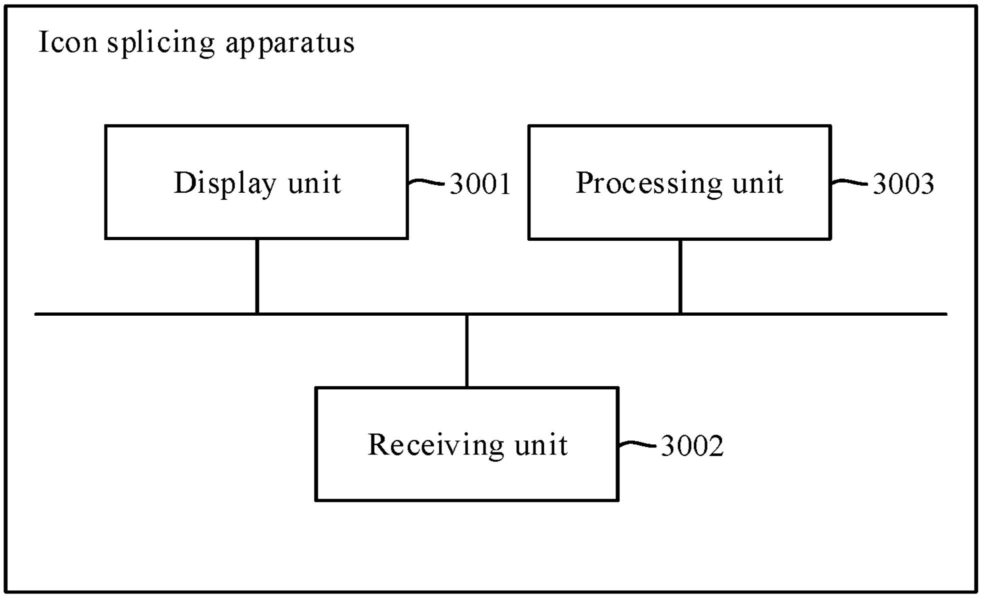
FIG. 30 is another schematic diagram of a structure of an icon splicing apparatus according to an embodiment of this application.

An embodiment of this application further provides an icon splicing apparatus, and the apparatus may be applied to a terminal device. FIG. 30 is another schematic diagram of a structure of an icon splicing apparatus according to an embodiment of this application. As shown in FIG. 30, the icon splicing apparatus may include a display unit 3001, a receiving unit 3002, a processing unit 3003, and the like.

The display unit 3001 is configured to display a first icon. The receiving unit 3002 is configured to receive a first operation, where the first operation is an operation of triggering splicing of the first icon. The processing unit 3003 is configured to display, in response to the first operation by using the display unit 3001, identifier information of one or more system capabilities supported by the terminal device. The receiving unit 3002 is further configured to receive a second operation, where the second operation is an operation of selecting identifier information of a first system capability. A first system capability includes at least one system capability supported by the terminal device. The processing unit 3003 is further configured to display, in response to the second operation, a spliced icon of the first icon and the first system capability by using the display unit 3001. The spliced icon has a function of supporting linkage between an application or a feature ability FA card corresponding to the first icon and the first system capability.

Optionally, the processing unit 3003 is further configured to start, in response to detecting a trigger of the first system capability, the application or the FA card corresponding to the first icon.

Optionally, the display unit 3001 is configured to display a first interface, where the first interface includes the first icon.

The receiving unit 3002 is configured to receive an operation of selecting the first icon. The processing unit 3003 is further configured to display, in response to the operation of selecting the first icon, an automatic trigger key corresponding to the first icon by using the display unit 3001. The receiving unit 3002 is further configured to receive an operation of tapping the automatic trigger key corresponding to the first icon. The operation of selecting the first icon and the operation of tapping the automatic trigger key corresponding to the first icon are the first operation.

In a possible implementation, the first icon is a spliced icon of a third icon and a fourth icon.

In a possible implementation, the receiving unit 3002 is further configured to receive an operation of splitting the spliced icon; and the processing unit 3003 is further configured to delete the spliced icon in response to the operation of splitting the spliced icon.

It should be understood that division of the units (or referred to as modules) in the apparatus is merely logical function division. During actual implementation, all or some of the units may be integrated into one physical entity or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware.

For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit with a signal processing ability. During implementation, steps in the foregoing methods or the foregoing units may be implemented by using a hardware integrated logic circuit in a processor element, or may be implemented in the form of software invoked by the processing element.

In an example, a unit in the foregoing apparatuses may be one or more integrated circuits configured to perform the foregoing method, for example, one or more application-specific integrated circuits (application-specific integrated circuits, ASICs), one or more digital signal processors (digital signal processors, DSPs), one or more field programmable gate arrays (field programmable gate arrays, FPGAs), or a combination of at least two of these integrated circuit forms.

For another example, when the unit in the apparatus may be implemented in a form of scheduling a program by the processing element, the processing element may be a general-purpose processor, for example, a central processing unit (central processing unit, CPU) or another processor that can invoke the program. For still another example, the units may be integrated and implemented in a form of a system-on-a-chip (system-on-a-chip, SOC).

In an implementation, a unit in the foregoing apparatus for implementing each corresponding step in the foregoing method may be implemented in a manner in which the processing element schedules the program. For example, the icon splicing apparatus may include a processing element and a storage element. The processing element invokes a program stored in the storage element, to perform the steps performed in the icon splicing methods in the foregoing method embodiments. The storage element may be a storage element on a same chip as the processing element, namely, an on-chip storage element.

In another implementation, a program configured to execute the foregoing method may be located on a storage element on a chip different from that of the processing element, namely, an off-chip storage element. In this case, the processing element invokes or loads a program from the off-chip storage element on the on-chip storage element, to invoke and perform the steps performed in the icon splicing methods in the foregoing method embodiments.

Embodiments of this application further provide an electronic device. The electronic device may be the foregoing terminal device. The electronic device includes: a processor, and a memory, configured to store instructions executable by the processor. When the processor is configured to execute the instructions, the electronic device is enabled to perform the icon splicing methods described in the foregoing method embodiments. The memory may be located inside the electronic device, or may be located outside the electronic device. There are one or more processors.

For example, the electronic device may include a terminal device like a mobile phone, a large screen (such as a smart screen), a tablet computer, a wearable device (such as a smartwatch or a smart band), a television, a vehicle-mounted device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), and the like. A specific form of the electronic device is not limited herein.

In still another implementation, units used by the electronic device to perform the steps in the foregoing icon splicing methods may be configured as one or more processing elements. The processing element herein may be an integrated circuit, for example, one or more ASICs, one or more DSPs, one or more FPGAs, or a combination of the integrated circuits. The integrated circuits may be integrated together to form a chip.

For example, an embodiment of this application further provides a chip, and the chip may be applied to the foregoing electronic device. The chip includes one or more interface circuits and one or more processors. The interface circuit is interconnected with the processor by using a line. The processor receives computer instructions from a memory of the electronic device by using the interface circuit and executes the computer instructions, to perform the icon splicing methods described in the foregoing method embodiments.

The foregoing descriptions about implementations allow a person skilled in the art to understand that, for the purpose of convenient and brief description, division of the foregoing functional modules is taken as an example for illustration. In actual application, the foregoing functions can be assigned to different functional modules and implemented based on a requirement, that is, an inner structure of an apparatus is divided into different functional modules to implement all or some of the functions described above.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium.

Based on such an understanding, the technical solutions in embodiments of this application essentially, or the part contributing to the conventional technology, or all or a part of the technical solutions may be implemented in a form of a software product, for example, a program. The software product is stored in a program product, for example, a computer-readable storage medium, and includes several instructions for instructing a device (which may be a single chip microcomputer, a chip, or the like) or a processor (processor) to perform all or some of the steps in the methods in embodiments of this application. The foregoing storage medium includes any medium that can store program code, such as a USB flash drive, a removable hard disk, a ROM, a RAM, a magnetic disk, or an optical disc.

For example, an embodiment of this application further provides a computer-readable storage medium. The computer-readable storage medium stores computer program instructions. When the computer program instructions are executed by an electronic device, the electronic device is enabled to perform the icon splicing methods in the foregoing method embodiments.

For another example, an embodiment of this application further provides a computer program product, including computer-readable code or a non-volatile computer-readable storage medium carrying computer-readable code. When the computer-readable code is run in an electronic device, a processor in the electronic device performs the icon splicing methods in the foregoing method embodiments.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An electronic device, comprising a processor, a memory, and a computer program, wherein the computer program is stored in the memory, and when the computer program is executed by the processor, the electronic device is enabled to:

display a first interface including a first icon;

receive a first operation for triggering to splice the first icon, wherein receive the first operation includes: receive an operation of selecting the first icon, display a splicing key corresponding to the first icon in response to the operation of selecting the first icon; and receive an operation of tapping the splicing key corresponding to the first icon;

display a second icon in response to the first operation;

receive a second operation of selecting the second icon and the first icon for splicing;

display options of a plurality of functions corresponding to the second icon in response to the second operation;

receive an operation of selecting an option of a second function, wherein the second function comprises one or more of the plurality of functions corresponding to the second icon; and display a spliced icon of the first icon and the second icon in response to the operation of selecting the option of the second function, wherein the spliced icon has a function of supporting linkage between a first function and the second function, and the first function comprises one or more of a plurality of functions corresponding to the first icon.

2. The electronic device according to claim 1, wherein when the computer program is executed by the processor, the electronic device is further enabled to:

display options of the plurality of functions corresponding to the first icon in response to the second operation; and receive an operation of selecting an option of the first function; wherein the display the spliced icon of the first icon and the second icon in response to the operation of selecting the option of the second function comprises:

display the spliced icon of the first icon and the second icon in response to the operation of selecting the option of the first function and the operation of selecting the option of the second function.

3. The electronic device according to claim 1, wherein the first function is a default splicing function corresponding to the first icon.

4. The electronic device according to claim 1, wherein when the computer program is executed by the processor, the electronic device is further enabled to:

receive an operation of tapping the spliced icon; and enable the first function and the second function in response to the operation of tapping the spliced icon.

5. The electronic device according to claim 1, wherein the display the spliced icon of the first icon and the second icon comprises:

obtain a current screen form of the terminal device;

determine a layout of the first icon and the second icon in the spliced icon based on the current screen form; and display the spliced icon of the first icon and the second icon based on the layout of the first icon and the second icon in the spliced icon.

6. The electronic device according to claim 5, wherein the determine the layout of the first icon and the second icon in the spliced icon based on the current screen form comprises:

when the current screen form is in a landscape state, determine that the layout of the first icon and the second icon in the spliced icon is a left-right layout; or when the current screen form is in a portrait state, determine that the layout of the first icon and the second icon in the spliced icon is a top-down layout.

7. The electronic device according to claim 1, wherein an area occupied by the first icon in the spliced icon is greater than an area occupied by the second icon in the spliced icon.

8. The electronic device according to claim 1, wherein the display the second icon in response to the first operation comprises:

display the first interface again in response to the first operation, wherein the first interface further comprises the second icon.

9. The electronic device according to claim 8, wherein when the computer program is executed by the processor, the electronic device is further enabled to:

when the first interface is displayed again, highlight the first icon in the first interface, or display a first identifier related to the first icon.

10. The electronic device according to claim 1, wherein the display the second icon in response to the first operation comprises:

display a second interface in response to the first operation, wherein the second interface comprises all icons of the terminal device, or an icon that supports splicing in all icons of the terminal device.

11. The electronic device according to claim 1, wherein when the computer program is executed by the processor, the electronic device is further enabled to:

receive an operation of previewing the spliced icon of the first icon and the second icon; and display a preview screen in response to the operation of previewing the spliced icon of the first icon and the second icon, wherein the preview screen comprises the spliced icon of the first icon and the second icon.

12. The electronic device according to claim 1, wherein the first icon is a spliced icon of a third icon and a fourth icon.

13. The electronic device according to claim 1, wherein when the computer program is executed by the processor, the electronic device is further enabled to:

receive an operation of splitting the spliced icon; and delete the spliced icon in response to the operation of splitting the spliced icon.

14. An electronic device, comprising a processor, a memory, and a computer program, wherein the computer program is stored in the memory, and when the computer program is executed by the processor, the electronic device is further enabled to:

display a first interface including a first icon;

receive a first operation of triggering to splice of the first icon, wherein receive the first operation includes: receive an operation of selecting the first icon, display a splicing key corresponding to the first icon in response to the operation of selecting the first icon; and receive an operation of tapping the splicing key corresponding to the first icon;

display identifier information of one or more system capabilities supported by the terminal device in response to the first operation;

receive a second operation of selecting identifier information of a first system capability, wherein the first system capability comprises at least one system capability supported by the terminal device; and display a spliced icon of the first icon and the first system capability in response to the second operation, wherein the spliced icon has a function of supporting linkage between an application or a feature ability (FA) card corresponding to the first icon and the first system capability.

15. The electronic device according to claim 14, wherein when the computer program is executed by the processor, the electronic device is further enabled to:

start the application or the FA card corresponding to the first icon in response to detecting a trigger of the first system capability.

16. An icon splicing method, wherein the method is applied to a terminal device, and the method comprises:

displaying a first interface including a first icon;

receiving a first operation of triggering to splice the first icon, wherein receive the first operation includes: receive an operation of selecting the first icon, display a splicing key corresponding to the first icon in response to the operation of selecting the first icon; and receive an operation of tapping the splicing key corresponding to the first icon;

displaying a second icon in response to the first operation;

receiving a second operation of selecting the second icon and the first icon for splicing;

displaying, in response to the second operation, options of a plurality of functions corresponding to the second icon;

receiving an operation of selecting an option of a second function, wherein the second function comprises one or more of the plurality of functions corresponding to the second icon; and displaying, in response to the operation of selecting the option of the second function, a spliced icon of the first icon and the second icon, wherein the spliced icon has a function of supporting linkage between a first function and the second function, and the first function comprises one or more of a plurality of functions corresponding to the first icon.

17. The method according to claim 16, wherein the method further comprises:

displaying, in response to the second operation, options of the plurality of functions corresponding to the first icon; and receiving an operation of selecting an option of the first function; and wherein the displaying, in response to the operation of selecting the option of the second function, the spliced icon of the first icon and the second icon comprises:

displaying, in response to the operation of selecting the option of the first function and the operation of selecting the option of the second function, the spliced icon of the first icon and the second icon.

18. The method according to claim 16, wherein the first function is a default splicing function corresponding to the first icon.

19. The method according to claim 16, wherein the method further comprises:

receive an operation of tapping the spliced icon; and enable the first function and the second function in response to the operation of tapping the spliced icon.

* * * * *